United States Patent
Onuki

(10) Patent No.: US 10,650,526 B2
(45) Date of Patent: May 12, 2020

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Kenji Onuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 15/626,520

(22) Filed: Jun. 19, 2017

(65) Prior Publication Data

US 2017/0372481 A1 Dec. 28, 2017

(30) Foreign Application Priority Data

Jun. 28, 2016 (JP) ................... 2016-127859
Jun. 28, 2016 (JP) ................... 2016-127860
May 1, 2017 (JP) ................... 2017-091400

(51) Int. Cl.
G06T 7/13 (2017.01)
G06T 7/50 (2017.01)
G06T 5/00 (2006.01)
G06T 7/00 (2017.01)

(52) U.S. Cl.
CPC ............ *G06T 7/13* (2017.01); *G06T 5/007* (2013.01); *G06T 7/00* (2013.01); *G06T 7/50* (2017.01); *G06T 2207/10052* (2013.01); *G06T 2207/20061* (2013.01); *G06T 2207/20076* (2013.01)

(58) Field of Classification Search
None
See application file for complete search history.

(56) References Cited

U.S. PATENT DOCUMENTS 9,456,126 B2   9/2016   Matsuoka
9,692,985 B2   6/2017   Yamaguchi
(Continued)

FOREIGN PATENT DOCUMENTS

JP    H08-009199 A    1/1996
JP    2005-275500 A   10/2005
(Continued)

OTHER PUBLICATIONS

Frantz, "Lesson 3: Vanishing Points and Looking at Art", <URL:http://www.math.miami.edu/~Itsai/pdfs/FrantzCrannell-Perspective-Lesson3.pdf/> Mar. 2016 (Year: 2016).*

*Primary Examiner* — Jiangeng Sun
(74) *Attorney, Agent, or Firm* — Venable LLP

(57) ABSTRACT

There is provided an image processing apparatus. A line segment detecting unit detects line segments from an image. An obtainment unit obtains distance information indicating a distance in a depth direction of the image. A selecting unit selects a line segment for vanishing point detection from the line segments detected by the line segment detecting unit. A vanishing point detecting unit detects a vanishing point of the image on a basis of the line segment for vanishing point detection. For each line segment detected by the line segment detecting unit, the selecting unit selects the line segment in a case where the distance indicated by the distance information is in a monotonically changing trend along the line segment.

12 Claims, 27 Drawing Sheets

(56) References Cited

U.S. PATENT DOCUMENTS

| | | | | |
|---|---|---|---|---|
| 2009/0022396 A1* | 1/2009 | Watanabe | ............ | G06K 9/4633 |
| | | | | 382/167 |
| 2010/0080467 A1* | 4/2010 | Sakurai | ............. | G06K 9/00798 |
| | | | | 382/195 |
| 2013/0094764 A1* | 4/2013 | Campbell | ................ | G06K 9/32 |
| | | | | 382/199 |
| 2015/0227779 A1* | 8/2015 | Kawai | .................. | H04N 13/122 |
| | | | | 382/154 |
| 2015/0227800 A1* | 8/2015 | Takemae | .................. | B60R 1/00 |
| | | | | 382/104 |
| 2017/0294002 A1* | 10/2017 | Jia | ........................... | G06T 5/006 |

FOREIGN PATENT DOCUMENTS

| | | |
|---|---|---|
| JP | 2009-284101 A | 12/2009 |
| JP | 2009-301585 A | 12/2009 |
| JP | 2014-154108 A | 8/2014 |
| JP | 2016-009062 A | 1/2016 |

\* cited by examiner

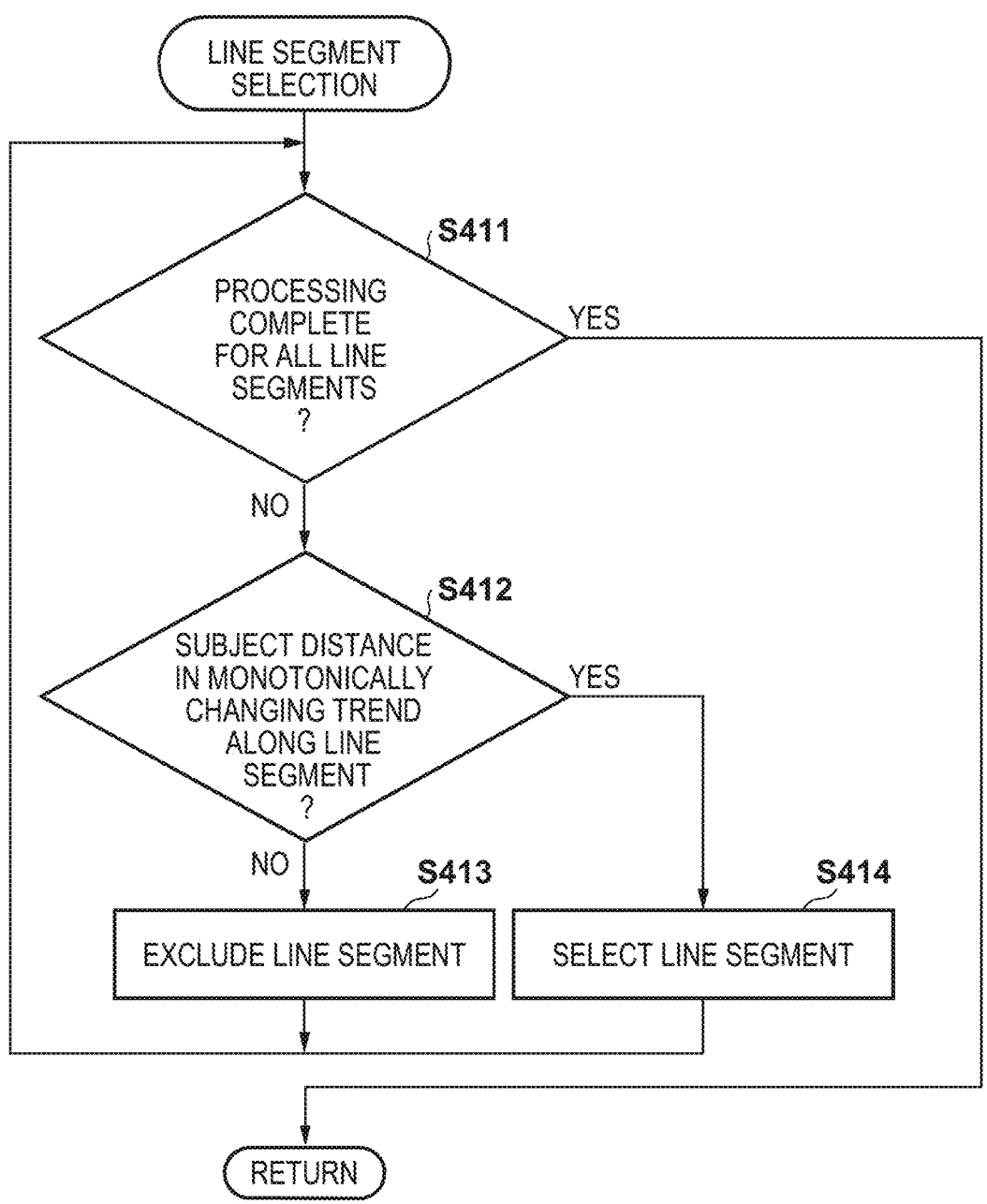

FIG. 13
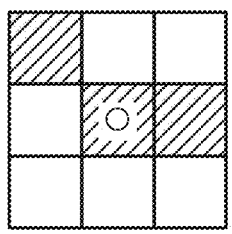 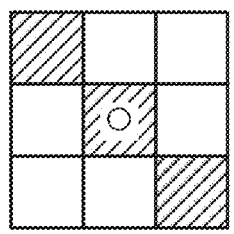 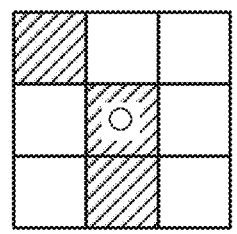
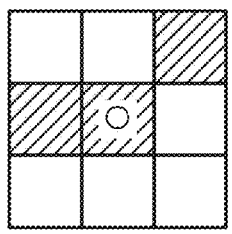 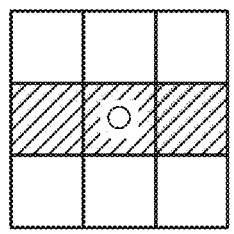 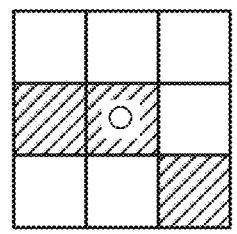
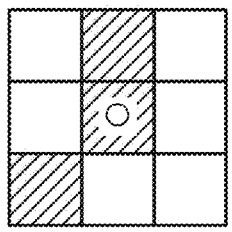 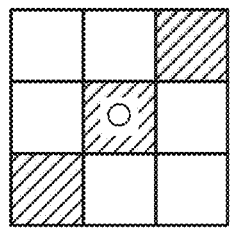 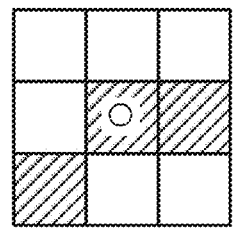
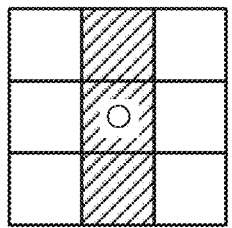 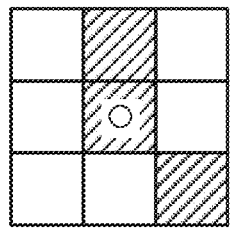 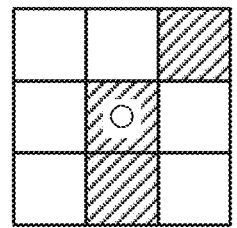

F I G. 23A
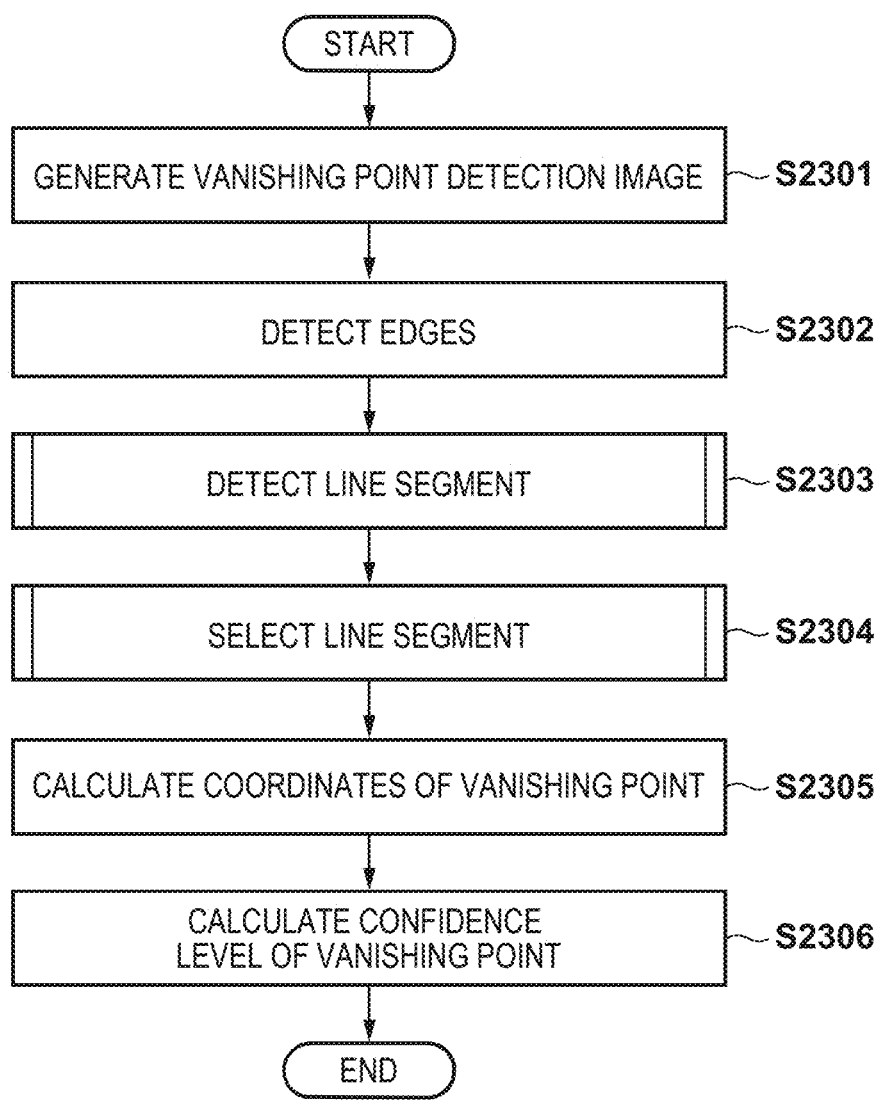

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

Conventional techniques for detecting a vanishing point that can be applied in the estimation of depth information of an image and the estimation of scenes such as a distant view and a close-range view are known. "Vanishing point" refers to a point of infinity where groups of parallel straight lines come together, used in methods that render perspectives. One technique detects a vanishing point by detecting a plurality of line segments from an image and then calculating coordinates of the vanishing point using various feature amounts such as the slopes, intersecting points, and so on of the line segments.

Japanese Patent Laid-Open No. 2005-275500 discloses a technique that eliminates noise-producing line segments not needed to detect the vanishing point, such as segments present in upper and lower sides of the image and segments that are almost horizontal, from the plurality of line segments detected from the image. Japanese Patent Laid-Open No. 2009-301585 discloses a technique that, when an image is being enlarged, detects the directions of edges before the enlargement, and brings the directions in which adjacent post-enlargement edge signals are connected to each other closer to the orientations thereof in order to suppress breaks in the lines.

According to the configuration disclosed in Japanese Patent Laid-Open No. 2005-275500, unnecessary line segments not extending in the depth direction, line segments contained in radial subjects, and so on cannot be effectively eliminated, and it is thus possible that the coordinates of the vanishing point cannot be calculated accurately. Meanwhile, according to the configuration disclosed in Japanese Patent Laid-Open No. 2009-301585, signals aside from the edge signals that constitute line segments will also be connected during the enlargement, and as a result, the processing for detecting line segments may take more time, the detection accuracy may drop, and so on.

SUMMARY OF THE INVENTION

Having been achieved in light of the aforementioned situation, the present invention provides a technique that improves the accuracy of detecting a vanishing point.

According to a first aspect of the present invention, there is provided an image processing apparatus comprising: a line segment detecting unit configured to detect line segments from an image; an obtainment unit configured to obtain distance information indicating a distance in a depth direction of the image; a selecting unit configured to select a line segment for vanishing point detection from the line segments detected by the line segment detecting unit; and a vanishing point detecting unit configured to detect a vanishing point of the image on a basis of the line segment for vanishing point detection, wherein for each line segment detected by the line segment detecting unit, the selecting unit selects the line segment in a case where the distance indicated by the distance information is in a monotonically changing trend along the line segment.

According to a second aspect of the present invention, there is provided an image capturing apparatus comprising: an image capturing unit configured to generate an image; a line segment detecting unit configured to detect line segments from the image; an obtainment unit configured to obtain distance information indicating a distance in a depth direction of the image; a selecting unit configured to select a line segment for vanishing point detection from the line segments detected by the line segment detecting unit; and a vanishing point detecting unit configured to detect a vanishing point of the image on a basis of the line segment for vanishing point detection, wherein for each line segment detected by the line segment detecting unit, the selecting unit selects the line segment in a case where the distance indicated by the distance information is in a monotonically changing trend along the line segment.

According to a third aspect of the present invention, there is provided an image processing method comprising: detecting line segments from an image; obtaining distance information indicating a distance in a depth direction of the image; selecting a line segment for vanishing point detection from the line segments detected in the detecting line segments; and detecting a vanishing point of the image on a basis of the line segment for vanishing point detection, wherein for each line segment detected in the detecting line segments, the line segment is selected in the selecting in a case where the distance indicated by the distance information is in a monotonically changing trend along the line segment.

According to a fourth aspect of the present invention, there is provided a non-transitory computer-readable storage medium which stores a program for causing a computer to execute an image processing method comprising: detecting line segments from an image; obtaining distance information indicating a distance in a depth direction of the image; selecting a line segment for vanishing point detection from the line segments detected in the detecting line segments; and detecting a vanishing point of the image on a basis of the line segment for vanishing point detection, wherein for each line segment detected in the detecting line segments, the line segment is selected in the selecting in a case where the distance indicated by the distance information is in a monotonically changing trend along the line segment.

According to a fifth aspect of the present invention, there is provided an image processing apparatus comprising: an edge detecting unit configured to detect edge signals from an image; an edge selecting unit configured to select, from the detected edge signals, an edge signal that meets a predetermined condition; a line segment detecting unit configured to detect line segments from the selected edge signals; and a vanishing point detecting unit configured to detect a vanishing point of the image on a basis of the detected line segment, wherein the predetermined condition is a condition in which presence/absence of an edge signal in each of pixels in a peripheral region surrounding a target edge signal corresponds to at least one of a predetermined one or more patterns.

According to a sixth aspect of the present invention, there is provided an image capturing apparatus comprising: an image capturing unit configured to generate an image; an edge detecting unit configured to detect edge signals from the image; an edge selecting unit configured to select, from the detected edge signals, an edge signal that meets a predetermined condition; a line segment detecting unit configured to detect line segments from the selected edge signals; and a vanishing point detecting unit configured to detect a vanishing point of the image on a basis of the detected line segment, wherein the predetermined condition is a condition in which presence/absence of an edge signal in each of pixels in a peripheral region surrounding a target edge signal corresponds to at least one of a predetermined one or more patterns.

According to a seventh aspect of the present invention, there is provided an image processing method comprising: detecting edge signals from an image; selecting, from the detected edge signals, an edge signal that meets a predetermined condition; detecting line segments from the selected edge signals; and detecting a vanishing point of the image on a basis of the detected line segment, wherein the predetermined condition is a condition in which presence/absence of an edge signal in each of pixels in a peripheral region surrounding a target edge signal corresponds to at least one of a predetermined one or more patterns.

According to an eighth aspect of the present invention, there is provided a non-transitory computer-readable storage medium which stores a program for causing a computer to execute an image processing method comprising: detecting edge signals from an image; selecting, from the detected edge signals, an edge signal that meets a predetermined condition; detecting line segments from the selected edge signals; and detecting a vanishing point of the image on a basis of the detected line segment, wherein the predetermined condition is a condition in which presence/absence of an edge signal in each of pixels in a peripheral region surrounding a target edge signal corresponds to at least one of a predetermined one or more patterns.

Further features of the present invention will become apparent from the following description of exemplary embodiments with reference to the attached drawings.

BRIEF DESCRIPTION OF THE DRAWINGS

FIG. 4B is a flowchart illustrating details of a line segment selection process performed in step S404.

FIG. 13 is a diagram illustrating a plurality of patterns pertaining to the presence/absence of edge signals in each of pixels in a peripheral region of an edge signal.

FIG. 23A is a flowchart illustrating the vanishing point detection process.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

The present embodiment describes a technique for determining the presence/absence of a vanishing point and calculating the coordinates of the vanishing point using various types of feature amounts in an image and distance information of a subject. Note that the descriptions in the present embodiment assume that an image of a distant view, which is one type of scene where the best effects can be expected, is captured. However, the technique described in the present embodiment can also be applied in scenes aside from distant views. Furthermore, although the following describes an image capturing apparatus as an example of an image processing apparatus, the image processing apparatus according to the present embodiment is not limited to an image capturing apparatus, and may be a personal computer (PC) or the like, for example.

Figure 1:
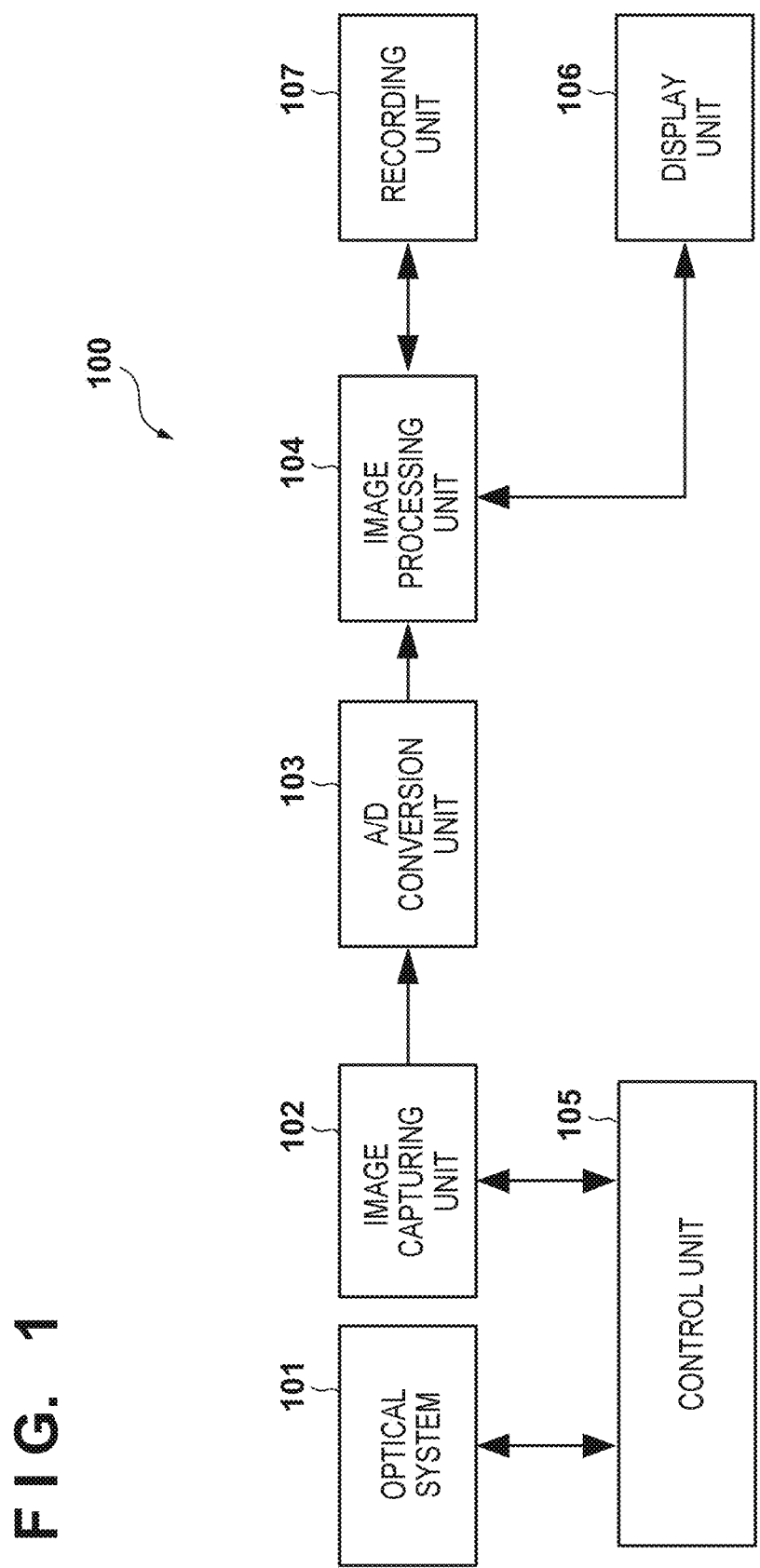
FIG. 1 is a block diagram illustrating the configuration of an image capturing apparatus 100.

FIG. 1 is a block diagram illustrating the configuration of an image capturing apparatus 100. In FIG. 1, an optical system 101 includes a lens group constituted of a zoom lens, a focus lens, and so on, an aperture adjustment device, and a shutter device. The optical system 101 adjusts a magnification, focus position, and light amount of a subject image that reaches an image capturing unit 102. The image capturing unit 102 is a photoelectric conversion element, such as a CCD or a CMOS sensor, that photoelectrically converts light beams of a subject passing through the optical system 101 into an electrical signal. An A/D conversion unit 103 converts an input analog image signal into digital image data.

Figure 2:
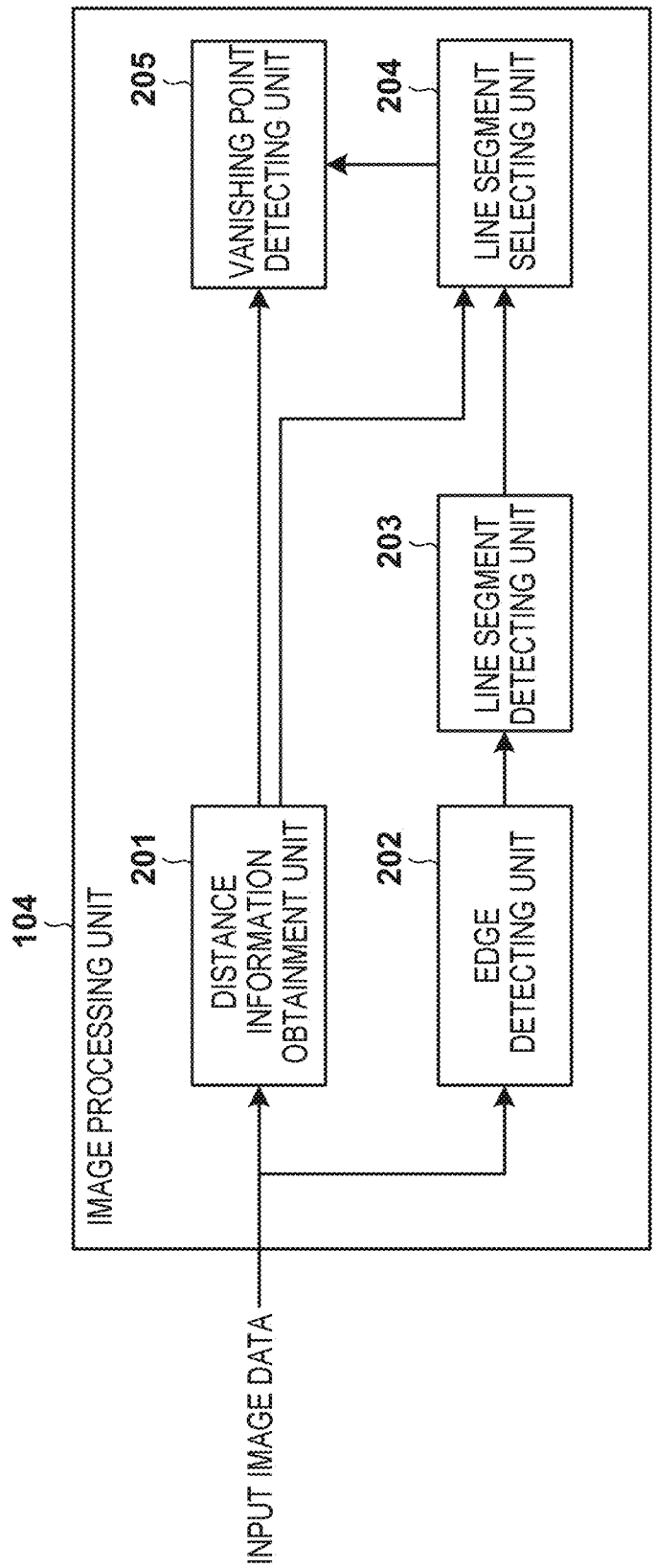
FIG. 2 is a block diagram illustrating the configuration, in an image processing unit 104, pertaining to a vanishing point detection process.

An image processing unit 104 carries out various types of image processing, such as developing processing, on input image data. The image processing unit 104 also carries out a vanishing point detection process, which will be described later. FIG. 2 is a block diagram illustrating the configuration, in the image processing unit 104, pertaining to the vanishing point detection process. Details regarding the processing handled by each block will be given later. The image processing unit 104 can carry out the same processing on both image data output from the A/D conversion unit 103 and image data read out from a recording unit 107.

A control unit 105 calculates an exposure amount used when capturing an image, and controls an aperture, a shutter speed, a sensor analog gain, and so on through the optical system 101 and the image capturing unit 102. A display unit 106 functions as an electronic viewfinder (EVF) by continuously displaying the image data output from the image processing unit 104 in a display member such as an LCD. The recording unit 107 has a function for recording image data, and may include an information recording medium using a memory card provided with a semiconductor memory, a package containing a rotating recording medium such as a magneto-optical disk, or the like, for example.

Figure 3:
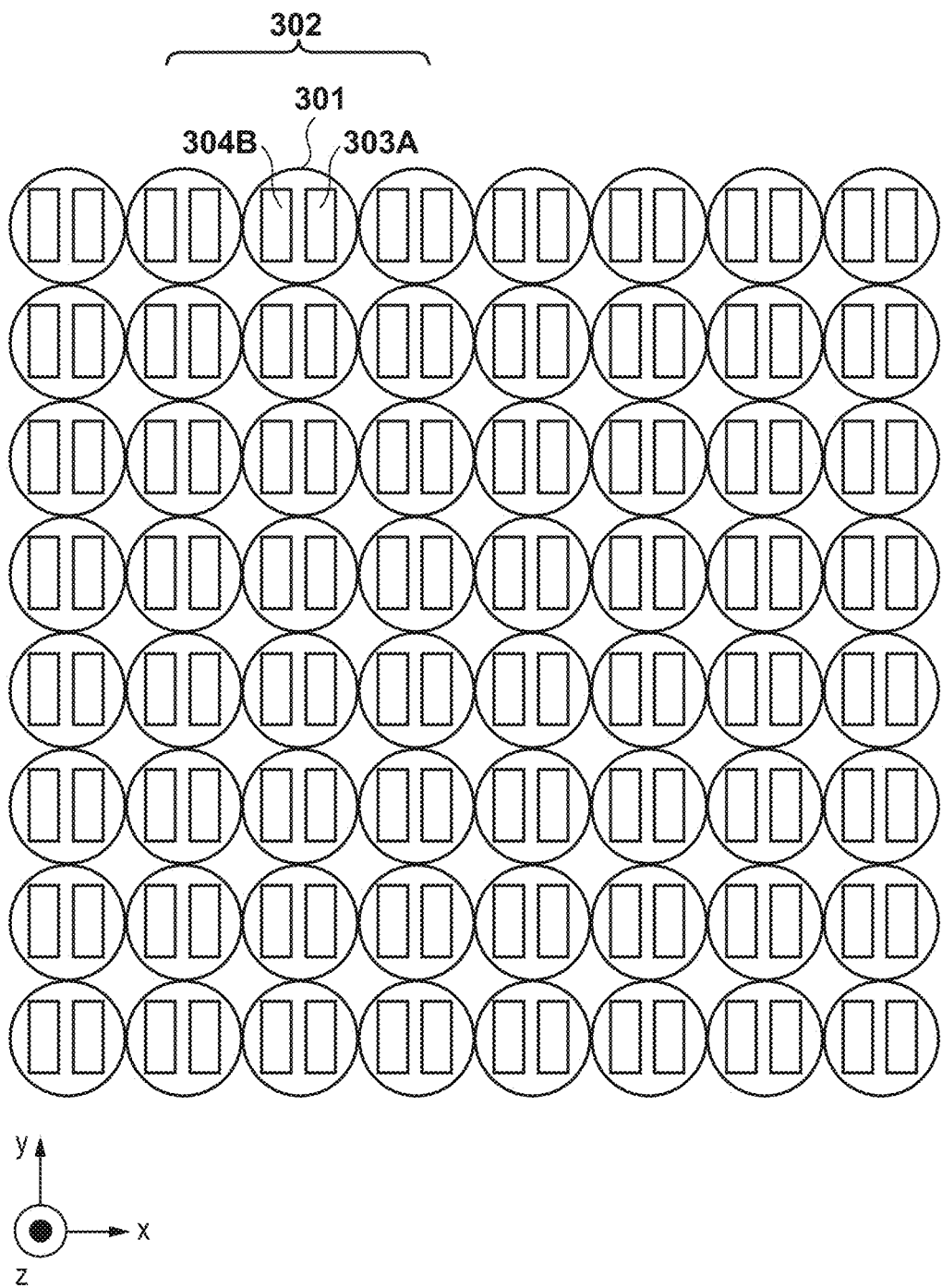
FIG. 3 is a diagram illustrating the configuration of a pixel array in an image capturing unit 102.

FIG. 3 is a diagram illustrating the configuration of a pixel array in the image capturing unit 102. The image capturing unit 102 includes a plurality of pixels 302 arranged regularly in two dimensions. Each of the pixels 302 is constituted of a microlens 301 and a pair of photoelectric conversion units 303A and 304B. The photoelectric conversion units 303A and 304B are configured to receive light through the microlens 301 at different regions of an exit pupil of the optical system 101 (pupil part regions) so as to carry out pupil division. Each of the photoelectric conversion units 303A and 304B generates a signal corresponding to the viewpoint of the corresponding pupil part region (a viewpoint signal). The plurality of viewpoint signals are equivalent to light field (LF) data, which is information of a spatial distribution and angular distribution of optical intensities. A normal captured image signal can be generated by adding the viewpoint signals corresponding to the pupil part regions.

Figure 4A:
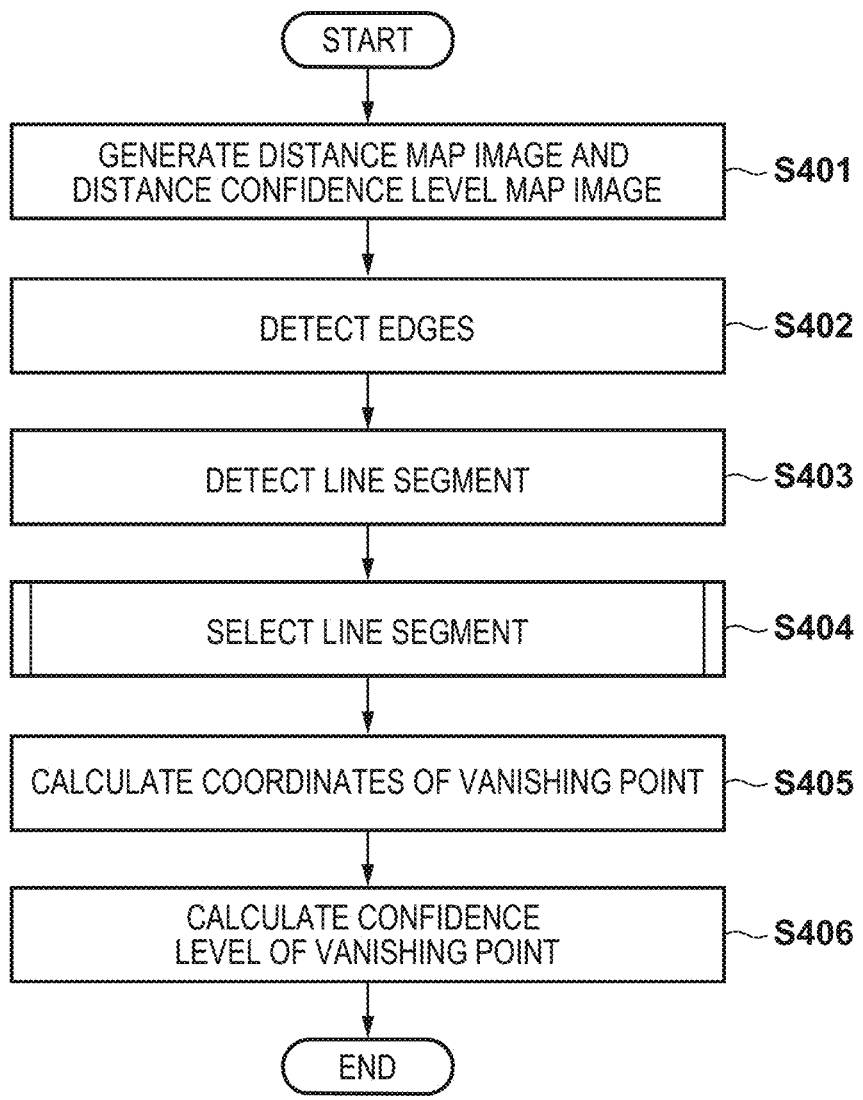
FIG. 4A is a flowchart illustrating the vanishing point detection process.
Figure 5A:
FIG. 5A is a diagram illustrating an example of a captured image.
Figure 5B:
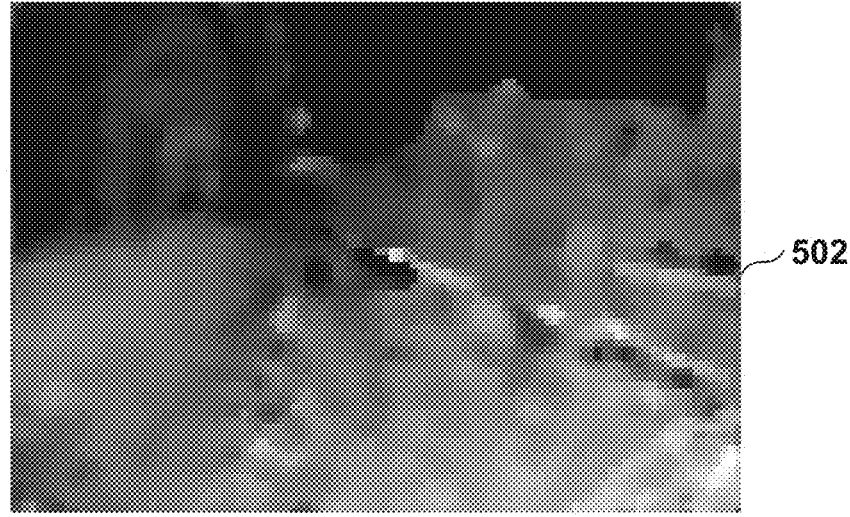
FIG. 5B is a diagram illustrating an example of a distance map image.
Figure 5C:
FIG. 5C is a diagram illustrating an example of a distance confidence level map image.

FIG. 4A is a flowchart illustrating the vanishing point detection process. In step S401, a distance information obtainment unit 201 (see FIG. 2) generates, on the basis of the LF data obtained by the image capturing unit 102, a distance map image indicating a distance to a subject in each of regions of a captured image (distance information) and a distance confidence level map image indicating a confidence level of each distance (confidence level information). FIG. 5A is a diagram illustrating an example of the captured image. The distance information obtainment unit 201 generates the distance map image and the distance confidence level map image on the basis of phase differences in the LF data corresponding to a captured image 501 (that is, phase differences between a plurality of viewpoint images). Any desired known method can be used as the specific method for generating the distance map image. For example, the distance map image can be generated from a defocus amount calculated on a pixel-by-pixel basis using the technique disclosed in Japanese Patent Laid-Open No. 2016-9062. Here, "confidence level" is a value expressing how easy it is to detect the aforementioned phase difference (image shift amount) in each region. Because a distance calculated in a region where the image shift amount is difficult to detect will likely be inaccurate, a value indicating a low confidence level is assigned to that region. A "region where the image shift amount is difficult to detect" is, for example, a region where there is little change in the pattern of the subject, such as the sky or the body of an automobile. The distance information obtainment unit 201 detects such regions and assigns low confidence levels to those regions. The distance information obtainment unit 201 uses an edge integral value as an index for determining whether or not there is little change in the pattern. Specifically, the distance information obtainment unit 201 calculates the edge integral value by integrating the absolute values of edge amplitudes of the pixels within minute blocks of the captured image 501. The distance information obtainment unit 201 compares the calculated edge integral value with a pre-set threshold, and in the case where the calculated edge integral value is lower than the threshold, determines the region to be a region with little pattern change. The distance information obtainment unit 201 then assigns a lower confidence level to that region than to regions where there is a high amount of pattern change. The distance confidence level map image for a distribution of subject distances can be generated by repeating this process for each minute block obtained from division. FIG. 5B is a diagram illustrating an example of the distance map image. In a distance map image 502, the closer a pixel is to white (that is, the higher the pixel value is), the closer that pixel is to the image capturing apparatus 100. FIG. 5C is a diagram illustrating an example of the distance confidence level map image. In a distance confidence level map image 503, a white region means that the confidence level of the distance value indicated in the distance map image 502 is higher, whereas a black region indicates that there is little change in the pattern of the subject and the confidence level of the distance value is therefore low.

Note that the LF data and the captured image 501 are, for example, recorded in the recording unit 107 in advance, and are read out from the recording unit 107 by the image processing unit 104. Alternatively, when the image processing unit 104 executes the vanishing point detection process, the LF data and the captured image 501 may be generated by the image capturing apparatus 100 capturing an image of the subject.

Figure 6A:
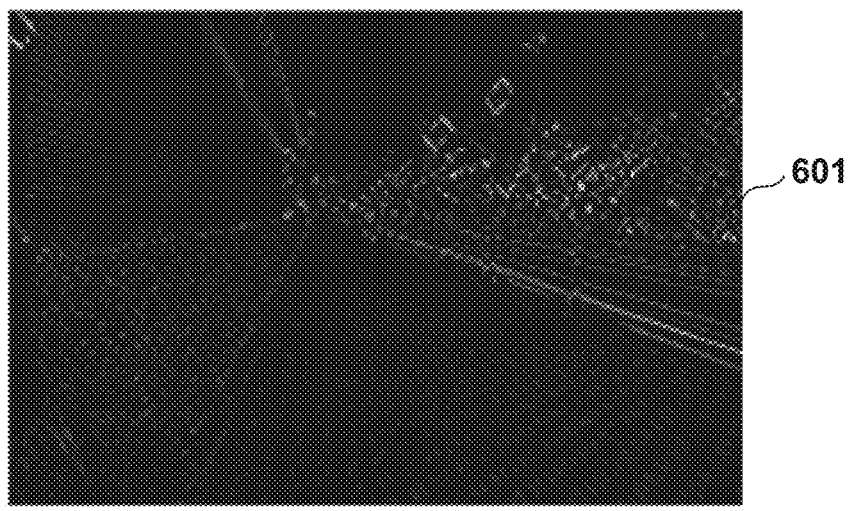
FIG. 6A is a diagram illustrating an edge image 601 corresponding to a captured image 501.

In step S402, an edge detecting unit 202 detects edge signals from the captured image 501 and generates an edge image. Any desired known method, such as a method that calculates a difference between an original image (the captured image 501) and an image obtained by applying a low-pass filter (LPF) to the original image or a method that uses an image obtained by applying a Sobel filter to the original image, can be used as the method for detecting the edge signals. FIG. 6A is a diagram illustrating an edge image 601 corresponding to the captured image 501.

Figure 6B:
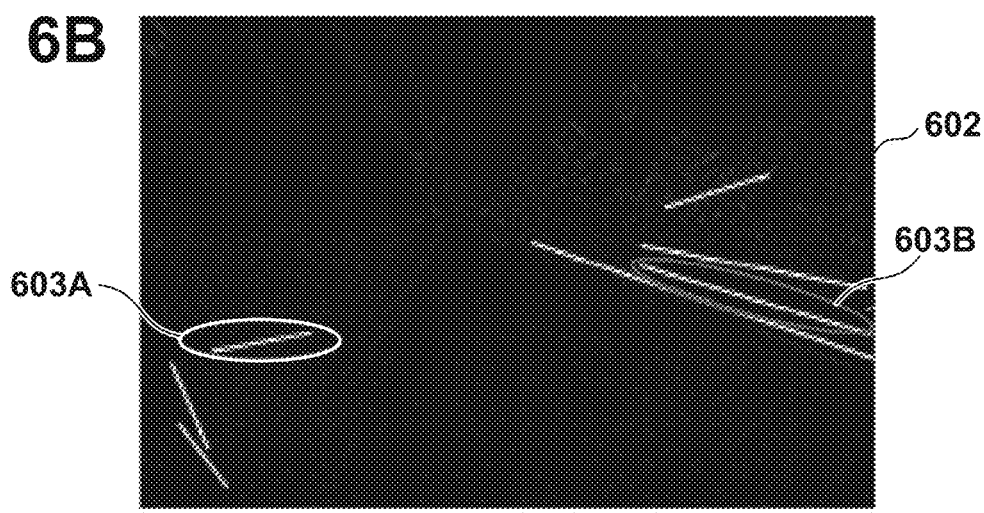
FIG. 6B is a diagram illustrating a line segment detection result corresponding to the edge image 601.

In step S403, a line segment detecting unit 203 detects line segments from the edge image 601 generated in step S402. Specifically, the line segment detecting unit 203 carries out a process for extracting line segments having a length greater than or equal to a threshold by applying a Hough transform to the edge image 601. FIG. 6B is a diagram illustrating a line segment detection result corresponding to the edge image 601. In FIG. 6B, an image 602 is an image indicating the line segment detection result corresponding to the edge image 601, and the parts indicated by white highlighting are regions detected as line segments. From this, it can be seen that line segments are being detected from subjects that have fine textures as well as line-shaped subjects. This is because with a subject having a fine texture, many points having high amplitudes (edges) are present locally on a single straight line in the Hough transform, and these are detected as a single line segment.

In step S404, a line segment selecting unit 204 selects, from the line segments detected in step S403, a line segment to be used to detect the vanishing point (a line segment for vanishing point detection). FIG. 4B is a flowchart illustrating details of the line segment selection process performed in step S404.

In step S411, the line segment selecting unit 204 determines whether or not the processing is complete for all of the line segments detected in step S403. In the case where the processing is not complete for all of the line segments, the line segment selecting unit 204 advances the processing to step S412, whereas in the case where the processing is complete for all of the line segments, the line segment selecting unit 204 advances the processing to step S405.

In step S412, the line segment selecting unit 204 determines whether or not the subject distance is in a monotonically changing trend (a monotonically increasing trend or a monotonically decreasing trend) along the line segment being processed (where the line segments detected in step S403 are selected to be processed in order). In the case where the subject distance is not in a monotonically changing trend, in step S413, the line segment selecting unit 204 excludes the line segment being processed from the line segments for vanishing point detection, and returns the processing to step S411. However, in the case where the subject distance is in a monotonically changing trend, in step S414, the line segment selecting unit 204 selects the line segment being processed as a line segment for vanishing point detection, and returns the processing to step S411.

The reason behind the conditional branching in step S412 is as follows. The position, in the depth direction, of a subject corresponding to a line segment moving toward the vanishing point normally changes from a position close to the image capturing apparatus 100 to a position far from the image capturing apparatus 100, as the position progresses from the side opposite from the vanishing point to the vanishing point. Accordingly, in the case where changes in the pixel values in the distance map image (FIG. 5B) are seen along a line segment moving toward the vanishing point, it is highly likely that there is a monotonic decrease from high values (close distances) to low values (far distances) (as described earlier, in the distance map image according to the present embodiment, higher pixel values indicate closer distances). However, even with a line segment moving toward the vanishing point, sections where the distance (pixel value) does not decrease monotonically (that is, sections of increase or sections of no change) may be present due to erroneous detection of the distance, for example. As such, the distance (pixel value) along a line segment moving toward the vanishing point does not necessarily decrease monotonically throughout all the sections. However, a monotonically decreasing trend can be expected as a whole. Meanwhile, which direction of a line segment is located on the side where the vanishing point is located is unclear before the vanishing point is detected, and thus if the distance (pixel value) is first taken from the vanishing point side, the distance (pixel value) will be in a monotonically increasing trend. Accordingly, in the case where the distance (pixel value) is in a monotonically increasing trend or a monotonically decreasing trend along the line segment, the line segment selecting unit 204 determines that it is highly likely that the line segment is a line segment moving toward the vanishing point, and selects that line segment as a line segment for vanishing point detection.

Figure 7A:
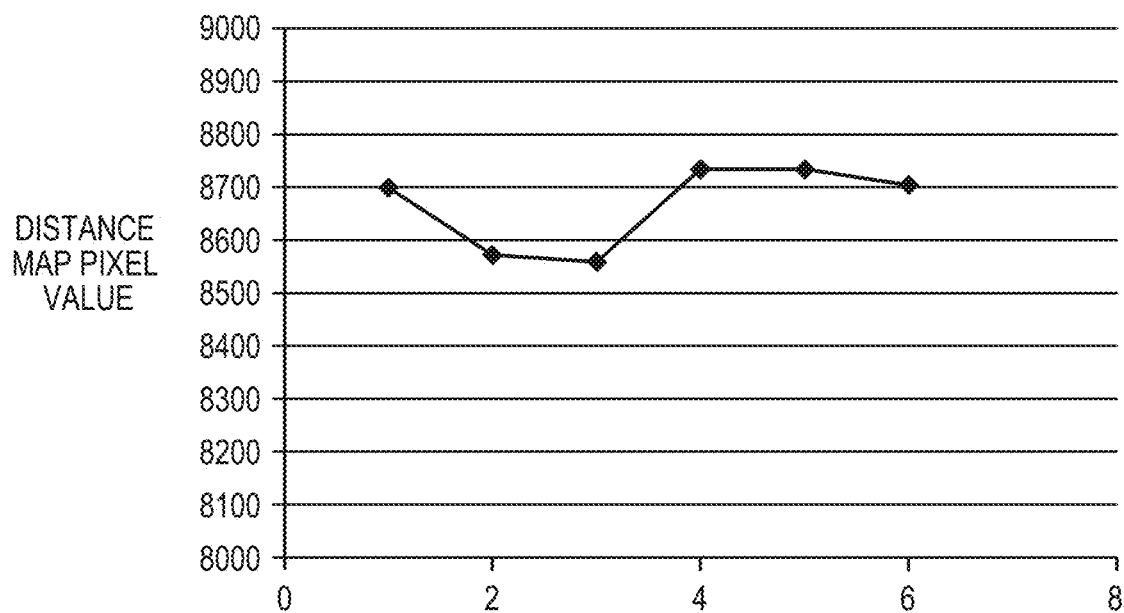
FIG. 7A is a graph illustrating changes in distance along a line segment 603A in FIG. 6B.
Figure 7B:
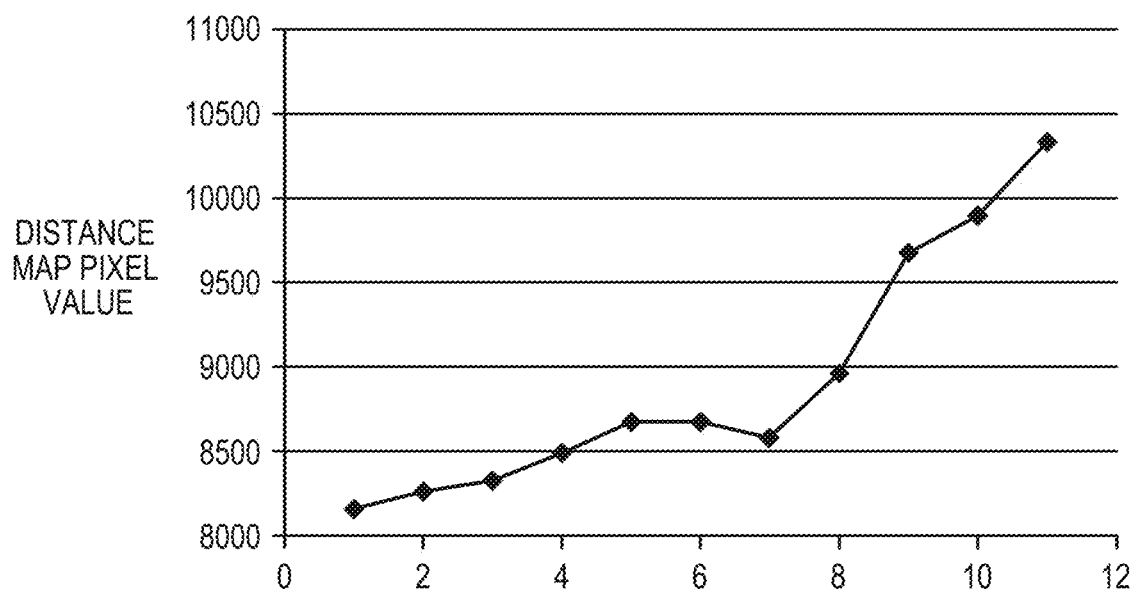
FIG. 7B is a graph illustrating changes in distance along a line segment 603B in FIG. 6B.

The process for determining whether or not the subject distance (pixel value) is in a monotonically changing trend along the line segment being processed will be described in detail. The line segment selecting unit 204 divides the line segment being processed into a plurality of sections, and obtains the distances (pixel values) of locations corresponding to the end points of those sections from the distance map image. FIG. 7A is a graph in which a line segment 603A indicated in FIG. 6B has been divided into five sections and the pixel values corresponding to the end points of those sections are plotted and connected by straight lines. In FIG. 7A, the horizontal axis represents the position in the line segment 603A, with a position 1 corresponding to the position of a left end, and positions 2 to 6 each corresponding to a position further toward a right end. The vertical axis represents the pixel value. Likewise, FIG. 7B is a graph in which a line segment 603B indicated in FIG. 6B has been divided into ten sections and the pixel values corresponding to the end points of those sections are plotted and connected by straight lines. The line segment selecting unit 204 detects the lengths of sections in which the distance is continually increasing (monotonically increasing sections) and the lengths of sections in which the distance is continually decreasing (monotonically decreasing sections). At this time, even a section in which the distance does not change (for example, the section from position 4 to position 5 in FIG. 7A) may be included as a monotonically increasing section (or a monotonically decreasing section) in the case where the length of that section is less than or equal to a threshold. The threshold for an unchanging section with respect to a monotonically increasing section (a second threshold) and the threshold for an unchanging section with respect to a monotonically decreasing section (a third threshold) may be the same, or may be different. It is assumed here that both of these thresholds are 1. As a result, in the example indicated in FIG. 7A, 2 is detected as the lengths of monotonically decreasing sections (positions 1 to 3 and positions 4 to 6), and 2 is detected as the length of a monotonically increasing section (positions 3 to 5). Likewise, in the example indicated in FIG. 7B, 2 is detected as the length of a monotonically decreasing section (positions 5 to 7), and 5 and 4 are detected as the lengths of monotonically increasing sections (positions 1 to 6 and positions 7 to 11). The line segment selecting unit 204 determines that the subject distance is in a monotonically changing trend in the case where a ratio of the maximum value of the detected lengths (number of sections) to the total number of sections is greater than or equal to a threshold (greater than or equal to 50%, for example). When such is not the case, the line segment selecting unit 204 determines that the subject distance is not in a monotonically changing trend. In the example indicated in FIG. 7A, the maximum value of the detected lengths is 2 and the total number of sections is 5, and thus the maximum value of the detected lengths is less than 50% of the total number of sections. Accordingly, for the line segment 603A, the line segment selecting unit 204 determines that the subject distance is not in a monotonically changing trend. Likewise, in the example indicated in FIG. 7B, the maximum value of the detected lengths is 5 and the total number of sections is 10, and thus the maximum value of the detected lengths is greater than or equal to 50% of the total number of sections. Accordingly, for the line segment 603B, the line segment selecting unit 204 determines that the subject distance is in a monotonically changing trend.

Note that various changes can be made to the above-described example of the method for determining the monotonically changing trend. More generally, in the case where a monotonically increasing section or a monotonically decreasing section having a length greater than or equal to a threshold (greater than or equal to a first threshold) is present in the line segment being processed, the line segment selecting unit 204 determines that the subject distance is in a monotonically changing trend along that line segment. This threshold (the first threshold) may change on the basis of the length of the line segment being processed. In this case, the threshold becomes higher as the line segment becomes longer.

Additionally, when detecting the lengths of monotonically increasing sections (or monotonically decreasing sections), sections in which the amount of increase (or amount of decrease) is high may be excluded from the monotonically increasing sections (or the monotonically decreasing sections). Furthermore, the line segment selecting unit 204 may refer to the distance confidence level map image 503 and exclude distance values corresponding to black regions (regions where the confidence level is low) from the determination. More generally, the line segment selecting unit 204 determines the monotonically changing trend on the basis of distances having a confidence level that is greater than or equal to a threshold (greater than or equal to a fourth threshold).

Furthermore, the method for determining the monotonically changing trend is not limited to that described above, and another method may be used. For example, the same number of plot points may be used regardless of the length of the line segment, and the determination may be carried out by finding an average of the values surrounding the value of each plot point on the line segment. Alternatively, an approximated line may be calculated from a group of plotted points using the least-squares method, and the determination may be made on the basis of changes in that value. As a result, a robust determination that suppresses the level of sensitivity to changes in the values in the distance map is possible.

Figure 6C:
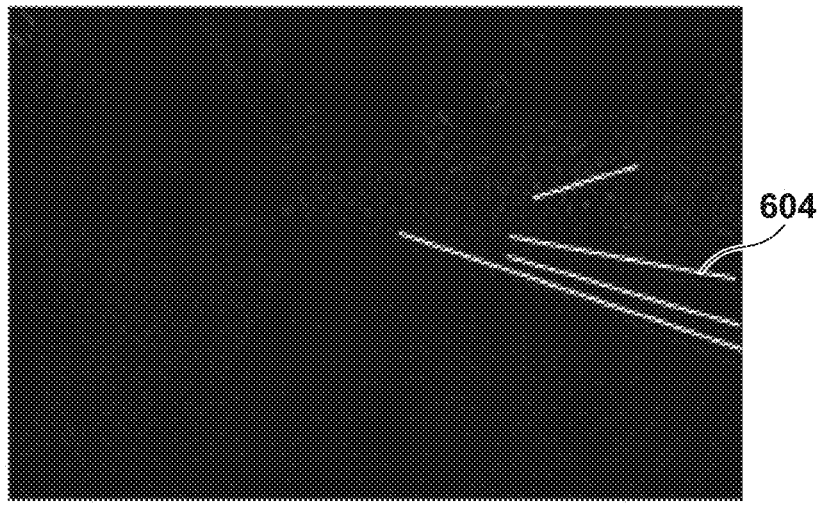
FIG. 6C is a diagram illustrating a line segment selection result.

FIG. 6C is a diagram illustrating a line segment selection result. As indicated by an image 604 in FIG. 6C, of the seven line segments (see FIG. 6B) detected in the edge image 601 (see FIG. 6A), four line segments have been selected.

Figure 8:
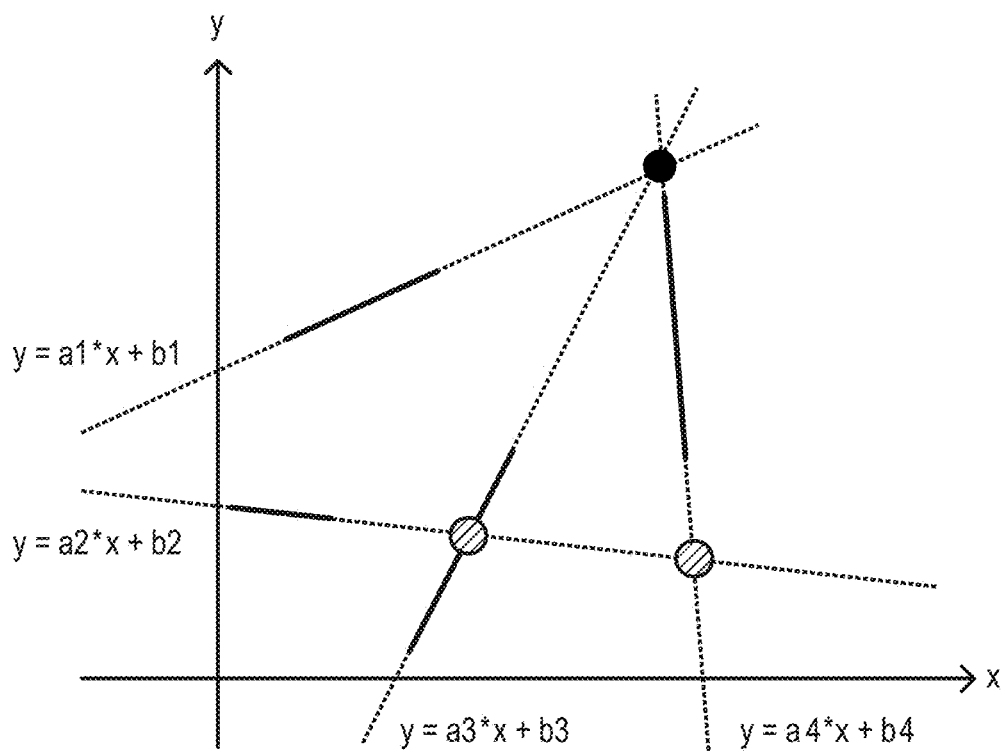
FIG. 8 is a diagram illustrating a method for calculating the coordinates of a vanishing point.
Figure 9:
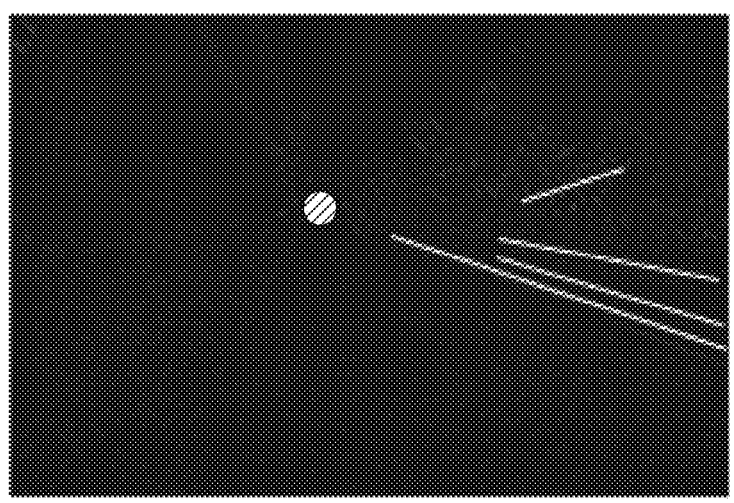
FIG. 9 is a diagram illustrating a vanishing point calculated on the basis of four line segments selected in the captured image 501 illustrated in FIG. 5A.

Returning to FIG. 4A, in step S405, a vanishing point detecting unit 205 calculates the coordinates of the vanishing point using the line segments selected in step S404. FIG. 8 illustrates the calculation method in detail. In FIG. 8, the line segments drawn as four bold lines indicate an example of the four line segments selected for use in the coordinate calculation, expressed in an xy coordinate space. Dotted lines indicate straight lines extending in the x-axis direction and the y-axis direction from these four line segments. First, the vanishing point detecting unit 205 calculates the coordinates of points of intersection between each pair of two straight lines, on the basis of the slopes and intercepts of those straight lines. Then, the vanishing point detecting unit 205 selects, as the final vanishing point, the point, among the points of intersection for which the coordinates have been calculated, where the most straight lines intersect (or pass through the vicinity). In FIG. 8, there are a plurality of points of intersection among the straight lines, and thus the coordinates of the point of intersection, indicated by a black point, through which the most straight lines pass, namely three straight lines, are calculated as the coordinates of the vanishing point. FIG. 9 illustrates a vanishing point calculated on the basis of the four line segments selected in the captured image 501 illustrated in FIG. 5A. In FIG. 9, the point indicated by the hatched circle is the vanishing point. Note that in the case where one line segment or no line segments have been selected in step S404, there are no points of intersection among straight lines, and thus the vanishing point detecting unit 205 determines that there is no vanishing point.

In step S406, the vanishing point detecting unit 205 calculates a confidence level VpConf for the vanishing point detected in step S405, using the following Formula (1). In Formula (1), LineNum represents the number of line segments selected in step S404, and IntersctNum represents the number of straight lines passing through the coordinates of the detected vanishing point.

$$VpConf = 255 \times \frac{InterectNum}{LineNum} \quad (1)$$

As can be seen from Formula (1), the confidence level VpConf takes on a higher value as the ratio of the number of straight lines passing through the vanishing point to the number of selected line segments increases.

Figure 10A:
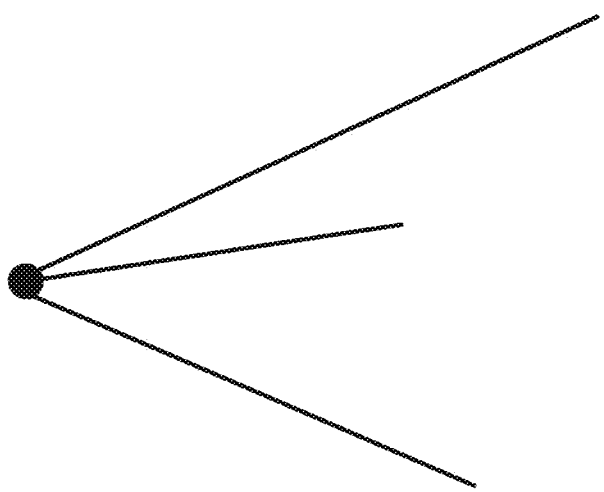
FIG. 10A is a diagram illustrating a case where line segments used for detecting a vanishing point reach the vanishing point.
Figure 10B:
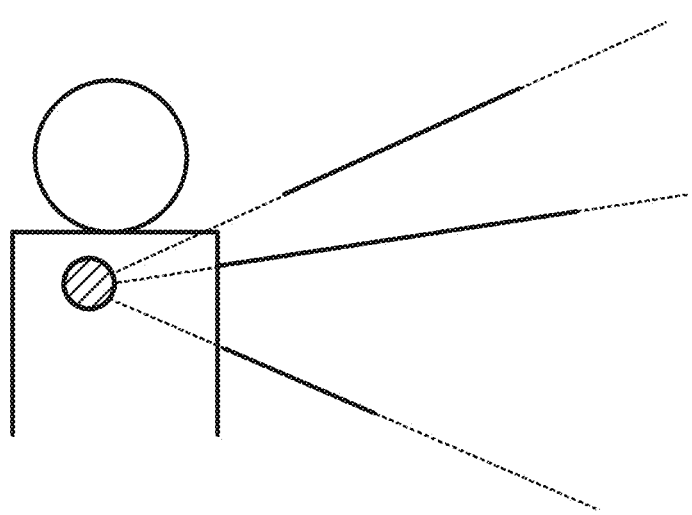
FIG. 10B is a diagram illustrating a case where line segments used for detecting a vanishing point do not reach the vanishing point.

Next, the vanishing point detecting unit 205 corrects the confidence level VpConf using the selected line segments and the coordinates of the vanishing point. This correction differs between a case where the line segments are not broken from the vanishing point (that is, the line segments reach the vanishing point), as illustrated in FIG. 10A, and a case where the line segments are broken from the vanishing point (that is, the line segments do not reach the vanishing point), as illustrated in FIG. 10B. The vanishing point detecting unit 205 compares the coordinates of the vanishing point with the coordinates of the end points of the line segments constituting the vanishing point. In the case where the number of line segments for which the difference is less than or equal to a threshold (less than or equal to a fifth threshold) is greater than or equal to half the total number of line segments constituting the vanishing point, the vanishing point detecting unit 205 determines that the line segments are not broken from the vanishing point. When such is not the case, however, the vanishing point detecting unit 205 determines that the line segments are broken from the vanishing point.

In the case where the line segments are not broken from the vanishing point, the vanishing point detecting unit 205 refers to the pixel value, in the distance map image 502, that corresponds to the coordinates of the vanishing point calculated in step S405 (a 14-bit value, for example), and determines whether or not the pixel value is greater than a threshold ThNear (3000, for example). In the case where the pixel value of the vanishing point is greater than the threshold ThNear (that is, the distance is closer than a threshold), the vanishing point detecting unit 205 reduces the value of the confidence level VpConf. When such is not the case, however, the vanishing point detecting unit 205 does not change the value of the confidence level VpConf. This is done because the vanishing point is, as a rule, present at infinity, and thus the confidence level of those coordinates are reduced in the case where the vanishing point indicates a close distance. In the case where a pixel value DisMap in the distance map is greater than the threshold ThNear, the vanishing point detecting unit 205 corrects the value of the confidence level VpConf using the following Formula (2).

$$VpConf = VpConf \times \frac{1}{1 + [(DisMap - ThNear)/1024]} \quad (2)$$

On the other hand, in the case where the line segments are broken from the vanishing point, it is possible that a close subject is present at the same xy coordinates as the vanishing point, as illustrated in FIG. 10B. Thus, it is not necessarily the case that the confidence level of the vanishing point is low, even in the case where the pixel value in the distance map image 502 corresponding to the coordinates of the vanishing point is high (in other words, the distance is close). Accordingly, in this case, the vanishing point detecting unit 205 does not change the value of the confidence level VpConf.

According to the first embodiment as described thus far, the image capturing apparatus 100 detects line segments from an image and, from the detected line segments, selects a line segment to be used in vanishing point detection. At this time, in the case where the distance in the depth direction of the image is in a monotonically changing trend along the line segment, the image capturing apparatus 100 selects that line segment as a line segment to be used in vanishing point detection. Through this, the accuracy at which the vanishing point is detected can be improved.

The present embodiment describes, as a configuration for obtaining the distance information, a configuration in which the distance information is obtained on the basis of a phase difference among a plurality of subject images producing light beams arriving from different regions of the pupil of an optical imaging system, as illustrated in FIG. 3. However, the distance information may be obtained using another configuration instead of or along with the stated configuration. For example, by configuring a compound eye camera having a plurality of lenses and image sensors, the image shift amount can be detected with higher accuracy. Alternatively, by configuring a Time of Flight (TOF) camera, the range-finding capabilities can be improved with respect to subjects in which the pattern changes little.

Furthermore, although the present embodiment describes a configuration in which the necessary line segments are selected and the coordinates of the vanishing point are calculated by referring to changes in distance, other information may be added as well. For example, rather than using a majority determination to set the point of intersection through which the most straight lines pass when calculating the coordinates of the vanishing point, the point of intersection may be selected after weighting on the basis of the slopes of the straight lines. For example, in a pixel array having horizontally-symmetrical photoelectric conversion units, such as that illustrated in FIG. 3 according to the present embodiment, the accuracy at which the image shift amount is detected is lower for horizontal lines than for vertical lines. Accordingly, by the weighting is increased as a line is closer to a vertical line and is reduced as a line is closer to a horizontal line, the coordinates of the vanishing point can be calculated from the points of intersection of straight lines having higher confidence levels with respect to changes in the distance. Of course, in the case where the photoelectric conversion units in the pixel array illustrated in FIG. 3 are constituted of vertically-arranged pairs, the weighting may instead be increased for straight lines closer to horizontal lines.

Second Embodiment

A second embodiment will describe a configuration in which edge signals not needed in the detection of the vanishing point are removed from the edge image in the vanishing point detection process. In the second embodiment, the basic configuration of the image capturing apparatus 100 is the same as in the first embodiment. The following will primarily describe areas that are different from the first embodiment.

Figure 11:
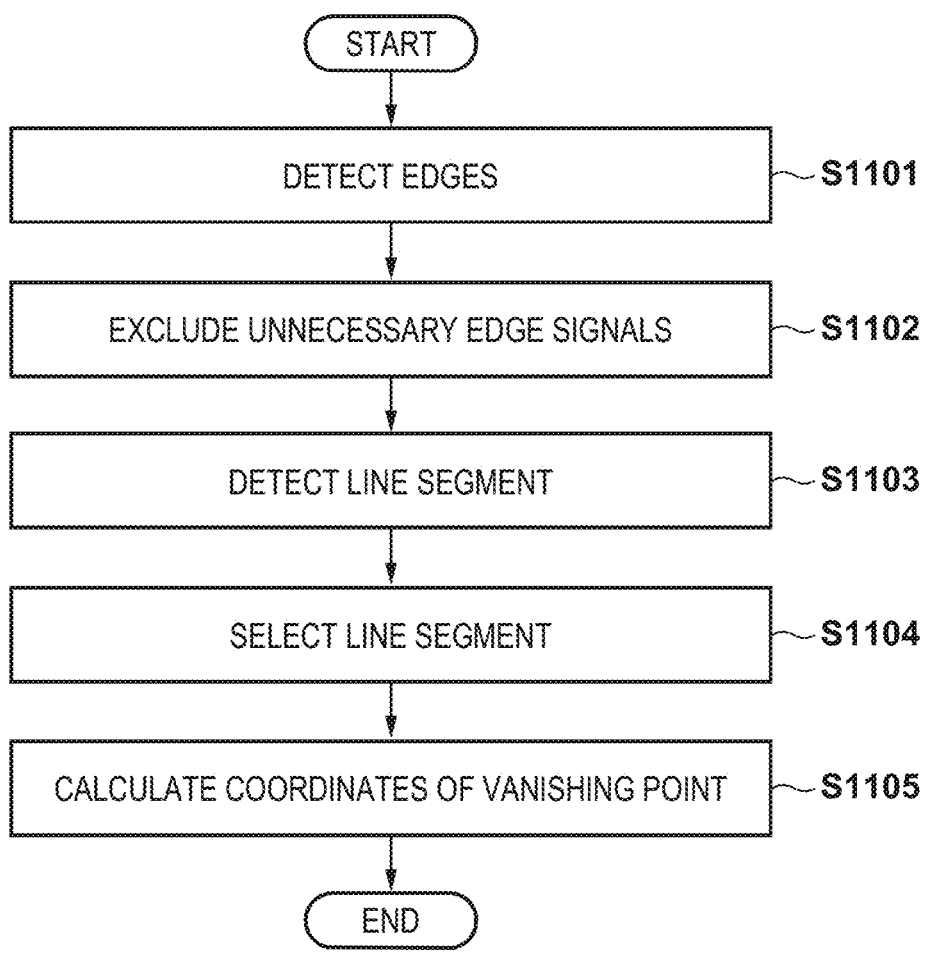
FIG. 11 is a flowchart illustrating a vanishing point detection process according to a second embodiment.
Figure 12:
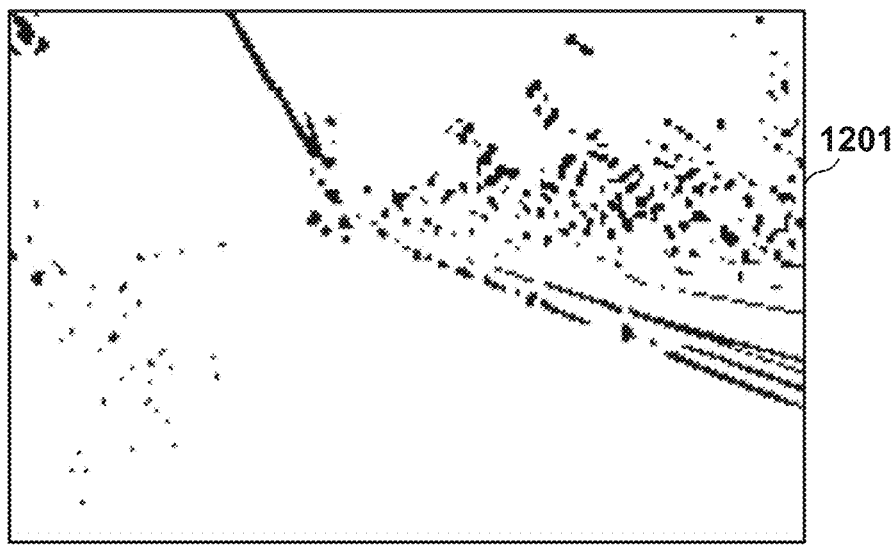
FIG. 12 is a diagram illustrating an edge image 1201 corresponding to the captured image 501 illustrated in FIG. 5A.

FIG. 11 is a flowchart illustrating the vanishing point detection process according to the second embodiment. In step S1101, the edge detecting unit 202 detects edge signals from the captured image 501 and generates an edge image. Here, the edge detecting unit 202 applies a 3×3 Sobel filter to the luminance signals of the captured image 501, and furthermore carries out binarization using a predetermined threshold. An edge image 1201 illustrated in FIG. 12, for example, is obtained as a result. In FIG. 12, black regions correspond to edge regions, and white regions correspond to non-edge regions.

In step S1102, the edge detecting unit 202 carries out a process for removing unnecessary edge signals from the edge image generated in step S1101. Here, "unnecessary edge signal" refers to an edge signal not needed in the process for detecting line segments to be used in the vanishing point detection, or in other words, a solitary edge signal that does not constitute a line segment. If many unnecessary edge signals remain in the edge image, the processing load for detecting line segments may increase, line segments unrelated to the vanishing point may be detected, and so on.

The removal of unnecessary edge signals (the selection of necessary edge signals) will be described in detail with reference to FIG. 13. FIG. 13 is a diagram illustrating a plurality of patterns pertaining to the presence/absence of edge signals in each of pixels in a peripheral region of an edge signal. In FIG. 13, a circle indicates an edge pixel at a position of interest (an edge pixel to be selected or removed), a hatched pixel indicates that an edge signal is present, and a white pixel indicates that it is acceptable for an edge signal to be present or absent. Although FIG. 13 illustrates 12 types of patterns for a configuration of an eight-pixel peripheral region surrounding the edge pixel at the position of interest, the number of patterns is not limited to 12, and any number greater than or equal to 1 may be used. The edge detecting unit 202 determines whether or not the eight-pixel peripheral region surrounding the edge pixel at the position of interest corresponds to at least one of the 12 types of patterns. In the case where the presence/absence of edge signals in the pixels of the peripheral region corresponds to a specific pattern, that peripheral region is determined to correspond to that specific pattern. In the case where the peripheral region corresponds to at least one of the 12 types of patterns, the edge detecting unit 202 leaves the edge pixel at the position of interest, whereas in the case where the peripheral region corresponds to none of the patterns, the edge detecting unit 202 sets the edge pixel at the position of interest to 0 (a non-edge signal). This makes it possible to remove the above-described unnecessary edge signals while maintaining fine continuity among the edge signals constituting line segments. To rephrase, the edge detecting unit 202 selects edge signals that meet a condition where the presence/absence of edge signals in the pixels of the peripheral region correspond to at least one of the 12 types of patterns (edge selection), and excludes the other edge signals. Note that the size of the pattern is not limited to 3×3, or 9, pixels including the edge pixel at the position of interest, and a pattern that refers to a broader range may be applied instead.

Figure 14A:
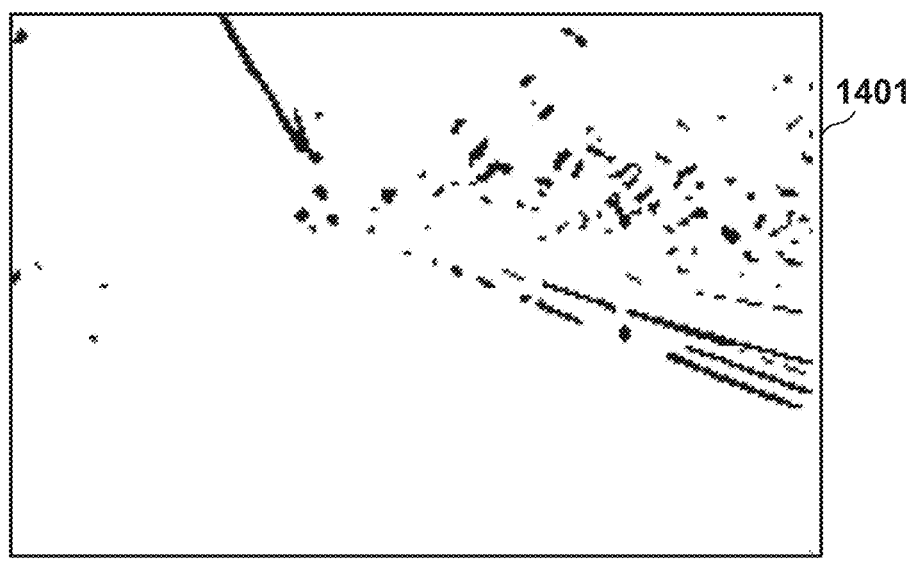
FIG. 14A is a diagram illustrating an edge image 1401 obtained by removing unnecessary edge signals from the edge image 1201 illustrated in FIG. 12.
Figure 14B:
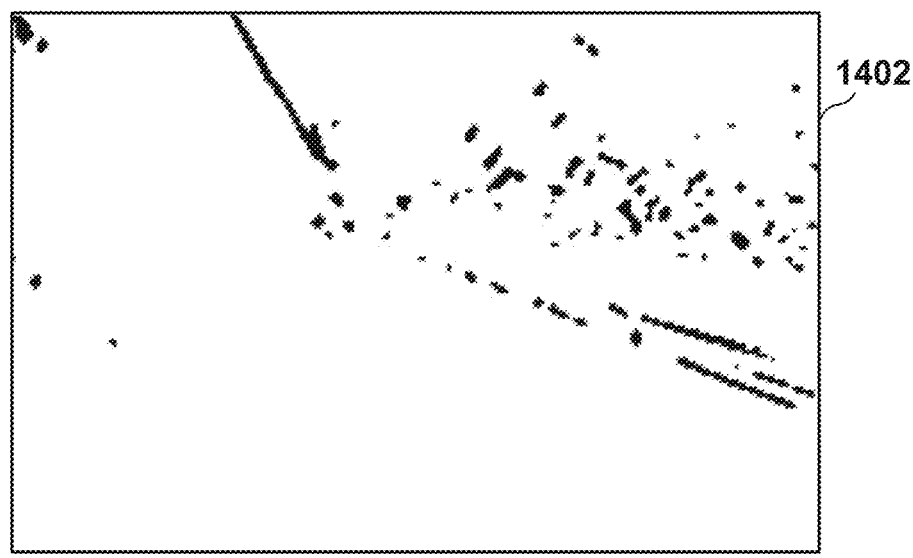
FIG. 14B is a diagram illustrating an edge image 1402 obtained by applying a 3×3 tap median filter to the edge image 1201 illustrated in FIG. 12.

An edge image 1401 illustrated in FIG. 14A is an edge image obtained by removing the unnecessary edge signals from the edge image 1201 illustrated in FIG. 12. Compared to the edge image 1201, it can be seen that the edge image 1401 has a reduced amount of solitary, fine edge signals, but fine lines still remain. For comparison, an edge image 1402 obtained by applying a 3×3 tap median filter to the edge image 1201 is illustrated in FIG. 14B. In the edge image 1402, edge signals corresponding to fine lines have been removed in addition to solitary, fine edge signals. Accordingly, compared to the edge image 1401, the edge image 1402 lacks many of the necessary edge signals constituting the line segments.

Figure 15A:
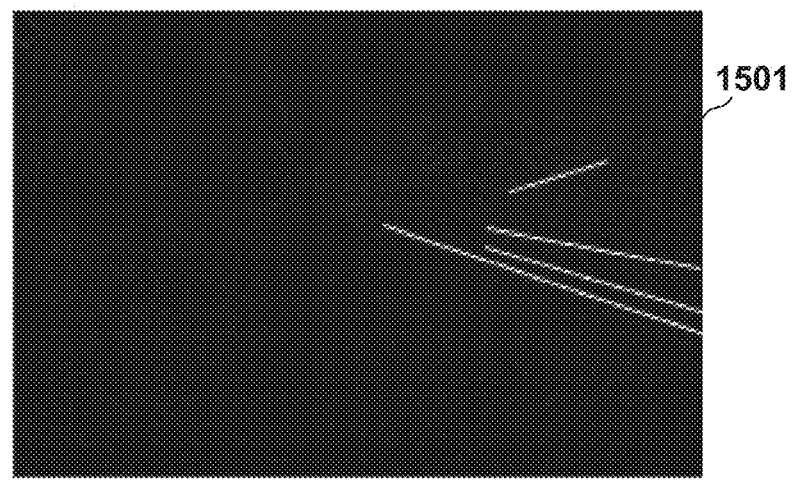
FIG. 15A is a diagram illustrating a line segment detection result corresponding to the edge image 1401.

In step S1103, the line segment detecting unit 203 detects line segments from the edge image 1401 obtained in step S1102. The details of the processing for detecting the line segments are the same as step S403 in FIG. 4A and described in the first embodiment. FIG. 15A is a diagram illustrating a line segment detection result corresponding to the edge image 1401. In FIG. 15A, an image 1501 is an image indicating the line segment detection result corresponding to the edge image 1401, and the parts indicated by white highlighting are regions detected as line segments.

In step S1104, the line segment selecting unit 204 selects, from the line segments detected in step S1103, a line segment to be used to detect the vanishing point (a line segment for vanishing point detection). Although the first embodiment describes a configuration in which the distance values in the line segments are selected by using the distance map image to refer to the changes in those distance values, the present embodiment describes a configuration in which the selection is made by referring to the slopes of the line segments. However, it is also possible to select the line segments using a combination with the configuration that refers to the changes in the distance values.

Figure 15B:
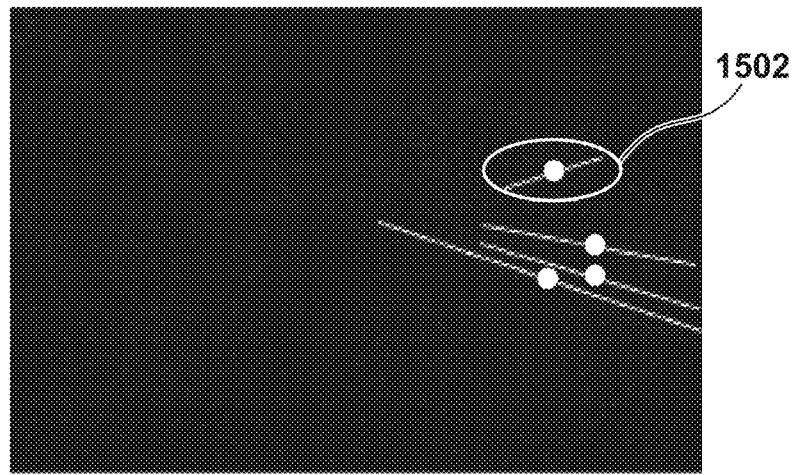
FIG. 15B is a diagram illustrating centerpoints in each of line segments from the line segment detection result corresponding to the edge image 1401.

Here, the line segment selecting unit 204 carries out a process for determining whether or not the coordinates where each of the line segments is located in the image match up with a slope corresponding to a region. Specifically, the line segment selecting unit 204 selects, as the line segments for vanishing point detection, a line segment having an upward-right slope in a left-side region of the image (a region corresponding to the left half, for example) and a line segment having an upward-left slope in a right-side region of the image (a region corresponding to the right half, for example). These selection criteria are particularly suited to an image obtained by a vehicle-mounted camera while the vehicle is traveling on a road, for example. An image 1601 in FIG. 16 indicates an example of an image obtained by the vehicle-mounted camera while the vehicle is traveling. While the vehicle is traveling in the left lane, the outside lane line, or in other words, a line segment having an upward-right slope, tends to be present in the left side of the image, whereas the lane boundary line, or in other words, a line segment having an upward-left slope, tends to be present in the right side of the image. In FIG. 15B, the centerpoint of each line segment is indicated by a white circle. From this, it can be seen that the centerpoints of all of the detected line segments are present to the right of the center of the image. Of those line segments, the line segment selecting unit 204 excludes a line segment 1502 having an upward-right slope and ultimately selects the remaining three line segments.

In step S1105, the vanishing point detecting unit 205 calculates the coordinates of the vanishing point using the line segments selected in step S1104. The details of the calculation method are the same as step S405 in FIG. 4A and described in the first embodiment. Ultimately, the coordinates of the vanishing point indicated by the hatched circle in FIG. 9 are obtained.

According to the second embodiment as described thus far, the image capturing apparatus 100 detects line segments from an edge image and, from the detected line segments, selects a line segment to be used in vanishing point detection. At this time, the image capturing apparatus 100 removes the unnecessary edge signals for the vanishing point detection on the basis of whether or not the peripheral region of each edge pixel corresponds to a predetermined pattern. Through this, the accuracy at which the vanishing point is detected can be improved while reducing the burden of the processing for detecting the line segments.

The present embodiment describes a configuration in which line segments that do not match a slope corresponding to a region within the image are excluded, as described with reference to step S1104, as the process for selecting the line segments to use in the vanishing point detection. However, rather than excluding these line segments, the values thereof may be reduced through weighting when calculating the coordinates of the vanishing point using the points of intersection between the line segments.

Figure 17:
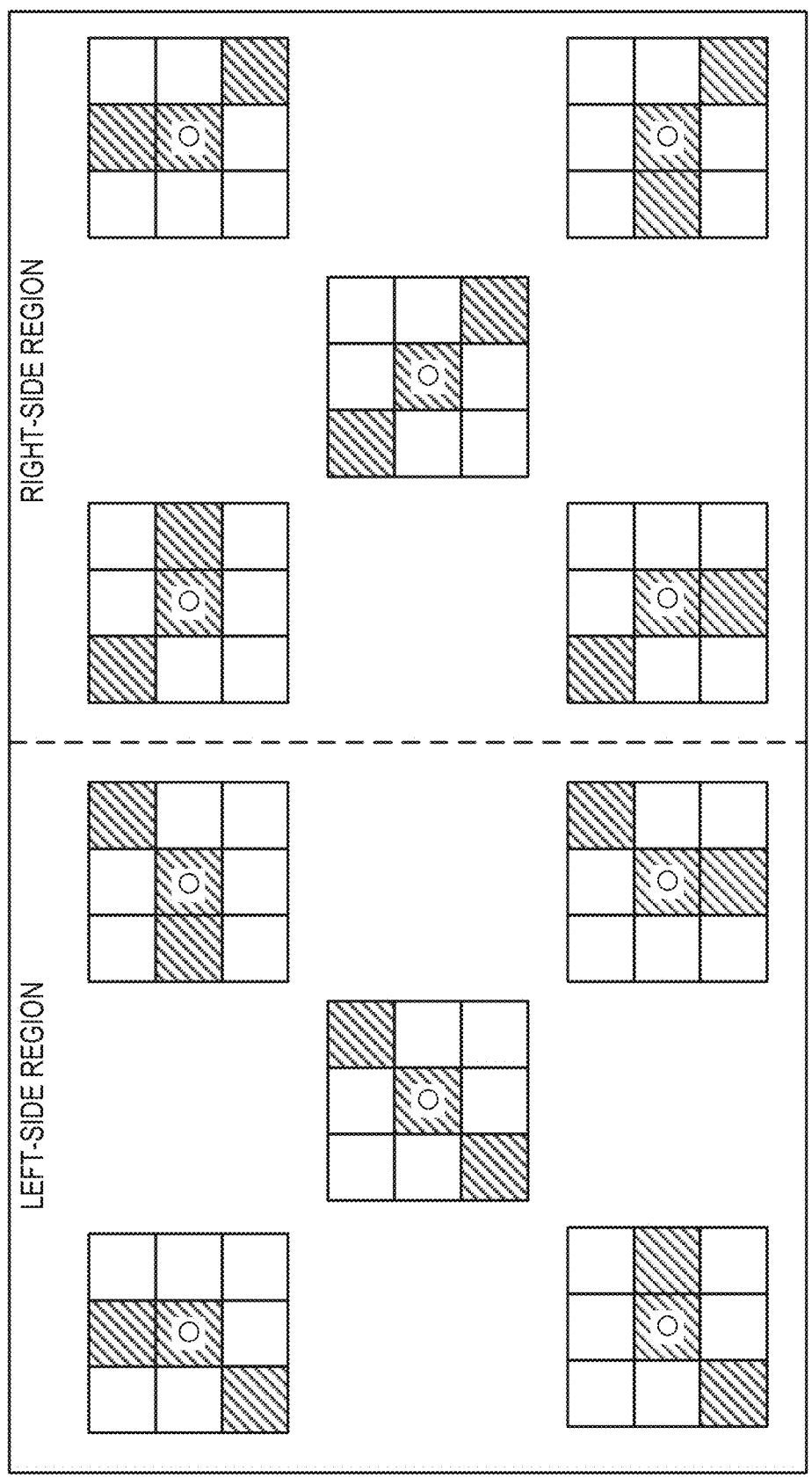
FIG. 17 is a diagram illustrating how a plurality of patterns pertaining to the presence/absence of edge signals in each of pixels in a peripheral region of an edge signal differ from region to region of an image.

Additionally, the present embodiment describes a configuration in which, with respect to removing edge signals, the 12 types of patterns indicated in FIG. 13 and described with reference to step S1102 are uniform throughout the overall edge image. However, the edge detecting unit 202 may use different patterns from region to region in the image of the target edge signal. For example, trends seen in the line segments from region to region within an image obtained by a vehicle-mounted camera, as described earlier, are used. In this case, in the left half of the edge image, only edge patterns having upward-right angles are used, whereas in the right half of the edge image, only edge patterns having upward-left angles are used. This makes it easier to remove the edge signals that constitute line segments unrelated to the vanishing point. FIG. 17 is a diagram illustrating patterns in each of regions, where five different patterns are associated using a centerline in the image (the dotted line) as a boundary.

Note that the pattern combinations are not limited to those illustrated in FIG. 17. The method for dividing the regions is also not limited to that indicated in FIG. 17, and other division methods are possible. For example, the image may be divided into four regions using the centerpoint thereof as a boundary, with patterns having upward-right angles being used in the upper-right and lower-left regions of the image and patterns having upward-left angles being used in the upper-left and lower-right regions of the image. This concept can furthermore be applied in the line segment selection process of step S1104, the vanishing point calculation process of step S1105, and so on.

Figure 16:
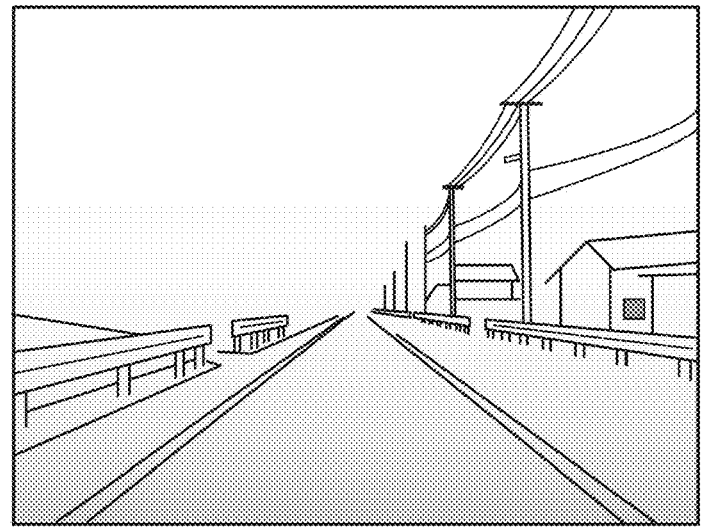
FIG. 16 is a diagram illustrating an example of an image obtained by a vehicle-mounted camera while the vehicle is traveling.

An image such as that obtained by a vehicle-mounted camera and illustrated in FIG. 16 is generally obtained while the vehicle is traveling forward, and thus the above-described trends in the slopes of the line segments may not apply when the vehicle is parked, is starting to move forward, is turning left or right, and so on. Accordingly, obtaining the movement of the image capturing apparatus 100 using a gyrosensor or GPS and using the slope information of line segments or edges only during travel makes it possible to improve the robustness with respect to the line segment detection process, the line segment selection process, and so on. For example, in the case where the obtained movement information indicates that the vehicle in which the image capturing apparatus 100 is mounted is moving forward, the edge detecting unit 202 selects (excludes) edge signals using different patterns depending on whether the region in the image where the edge signal to be processed is located is the left-side region or the right-side region.

Furthermore, the value of the confidence level of the vanishing point may be corrected in accordance with the tilt, height (elevation), and so on of the image capturing apparatus 100, including swing and roll components, in addition to the movement of the image capturing apparatus 100. For example, the vanishing point tends to be lower than the center of an image in the case where the image capturing apparatus 100 swings upward from the group when capturing an image from the ground, and tends to be higher than the center of an image in the case where the image capturing apparatus 100 swings downward. Accordingly, the value of the confidence level may be raised in the case where these relationships hold true and lowered in the case where the relationships do not hold true. Meanwhile, in the case where the image capturing apparatus 100 is tilted in the vertical direction so as to capture a vertical image, the above-described up-down relationship is replaced with a left-right relationship, and the level of priority of the patterns, the slopes of the line segments, and so on depending on the region in the image used to remove the edge signals also changes in accordance therewith.

Third Embodiment

A third embodiment describes a correction process using information of the coordinates of the vanishing point. In the third embodiment, the basic configuration of the image capturing apparatus 100 is the same as in the first embodiment. The following will primarily describe areas that are different from the first embodiment.

Figure 18:
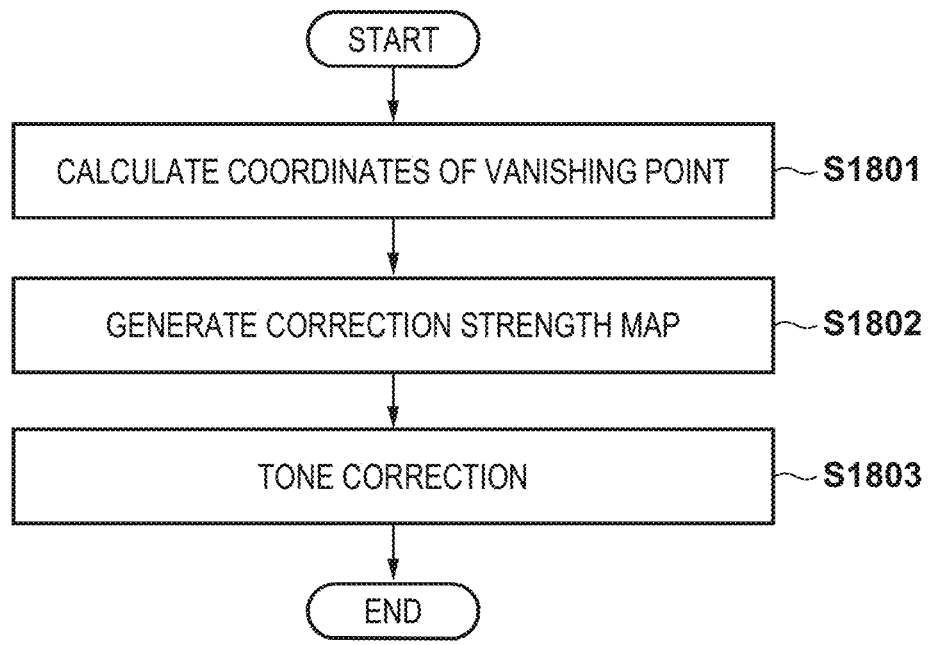
FIG. 18 is a flowchart illustrating a correction process.

FIG. 18 is a flowchart illustrating the correction process. In step S1801, the image capturing apparatus 100 calculates the coordinates of the vanishing point in the image illustrated in FIG. 16. The calculation method described in the first embodiment or the second embodiment can be used as the specific calculation method here.

Figure 19:
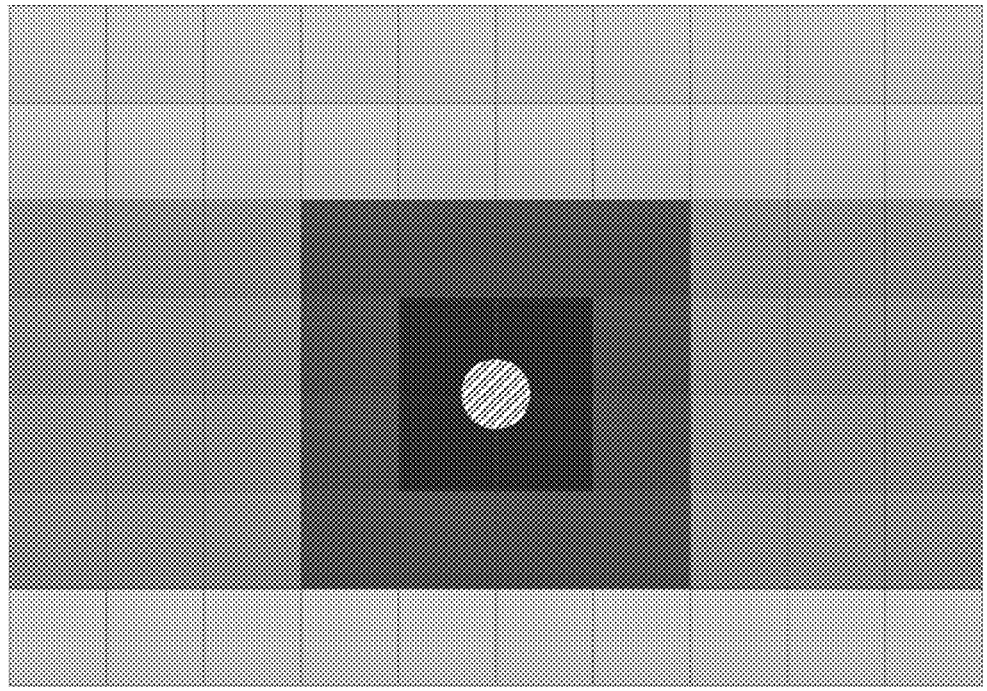
FIG. 19 is a diagram illustrating a correction strength map.

In step S1802, the image processing unit 104 uses the coordinates of the vanishing point calculated in step S1801 to generate a correction strength map, which is used when carrying out a tone correction process in each of regions. FIG. 19 is a diagram illustrating the generated correction strength map. The hatched circle indicates the position of the detected vanishing point. Additionally, with respect to the darkness of each block obtained through division, blocks closer to black have a higher correction strength, and blocks closer to white have a lower correction strength. The distance is greater near the vanishing point, and the vanishing point may be difficult to see in the actual image due to reduced contrast caused by mist or fog, or at night, due to low luminance caused by being far from illumination light. A high correction strength is therefore set near the vanishing point in order to increase the effect of the correction process.

In step S1803, the image processing unit 104 carries out the tone correction process in each of the regions using the correction strength map generated in step S1802. As the tone correction process, the image processing unit 104 sets and corrects, in accordance with each captured scene, tone characteristics for preferentially correcting the brightness of dark areas and bright areas, and tone characteristics for correcting mainly a mid-luminance contrast. For example, an effect suited to the scene can be obtained by carrying out control such that the brightness is strongly corrected in a scene where the By value is lower than a predetermined value, such as a night scene, and the contrast is emphasized in other cases. A known technique, such as that described in Japanese Patent Laid-Open No. 2014-154108, can be used as a method for correcting the brightness, contrast, and so on locally. In other words, the image processing unit 104 carries out the correction using tone characteristics through which the contrast is stronger in blocks having higher correction strengths. Note that the method for correcting the tone is not limited thereto, and another method may be used instead. Here, the size of the blocks obtained through division can be set as desired, and weighted addition may be carried out at boundary regions between blocks after providing overlapping regions between adjacent blocks, such that drastic changes in the effect are not visible in the image.

As described thus far, according to the third embodiment, the image capturing apparatus 100 generates the correction strength map on the basis of the calculated vanishing point coordinates, and carries out various types of correction processes at correction strengths set according to the distance from the vanishing point. At this time, the image capturing apparatus 100 carries out correction processes for different distances so as to increase the effect of correcting the brightness, contrast, and so on in regions closer to the vanishing point. As a result, the visibility of the captured image can be improved while also suppressing an increase in the processing burden.

Although the present embodiment describes a configuration in which the brightness, contrast, and so on are corrected as the correction process, the configuration is not limited thereto, and the hue, saturation, or the like may be changed as well.

Fourth Embodiment

The present embodiment describes a technique for determining the presence/absence of a vanishing point and calculating the coordinates of the vanishing point using various types of feature amounts in an image. Note that the descriptions in the present embodiment assume that an image of a distant view, which is one type of scene where the best effects can be expected, is captured. However, the technique described in the present embodiment can also be applied in scenes aside from distant views. Furthermore, although the following describes an image capturing apparatus as an example of an image processing apparatus, the image processing apparatus according to the present embodiment is not limited to an image capturing apparatus, and may be a personal computer (PC) or the like, for example.

Figure 20:
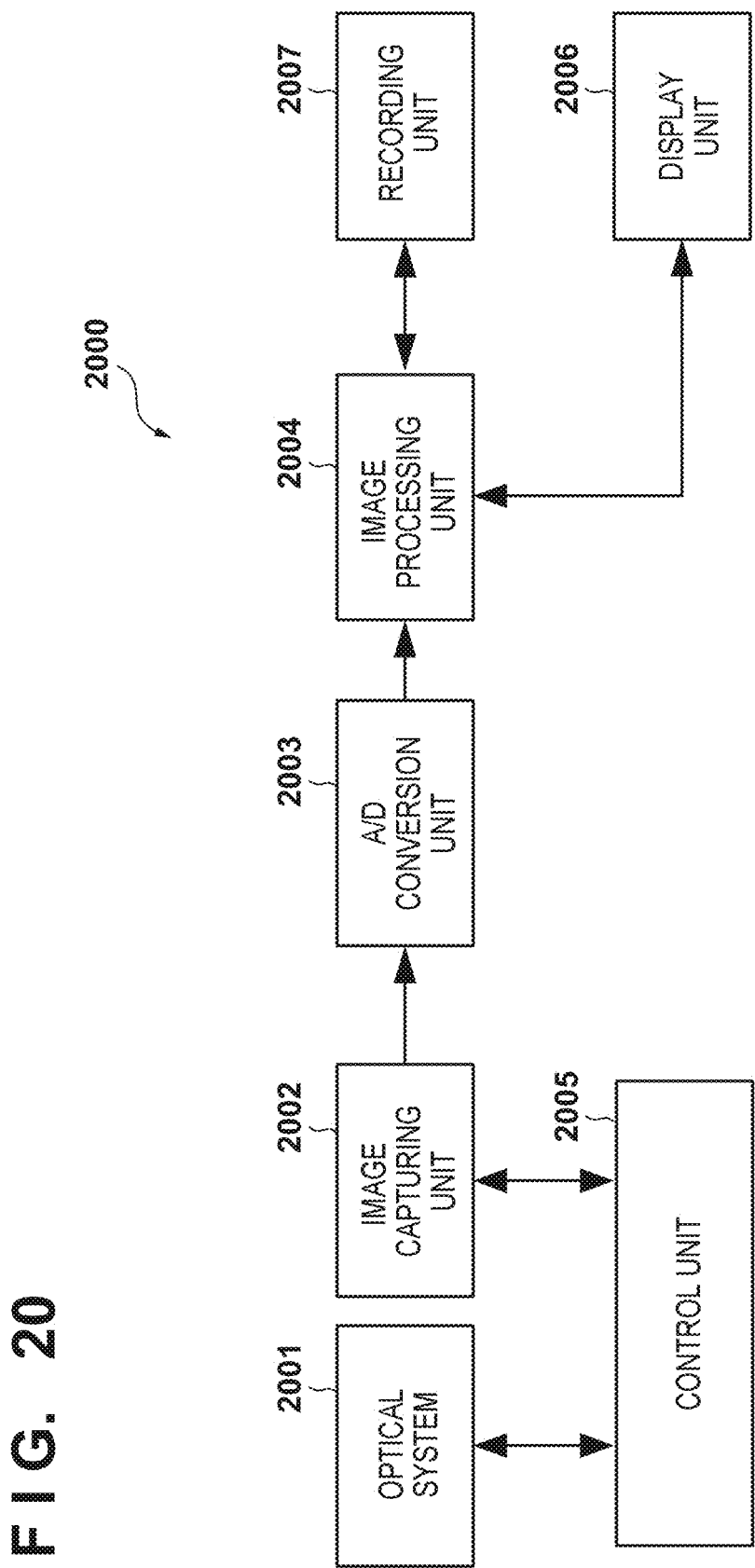
FIG. 20 is a block diagram illustrating the configuration of an image capturing apparatus 2000.

FIG. 20 is a block diagram illustrating the configuration of an image capturing apparatus 2000. In FIG. 20, an optical system 2001 includes a lens group constituted of a zoom lens, a focus lens, and so on, an aperture adjustment device, and a shutter device. The optical system 2001 adjusts a magnification, focus position, and light amount of a subject image that reaches an image capturing unit 2002. The image capturing unit 2002 is a photoelectric conversion element, such as a CCD or a CMOS sensor, that photoelectrically converts light beams of a subject passing through the optical system 2001 into an electrical signal. An A/D conversion unit 2003 converts an input analog image signal into digital image data.

Figure 21:
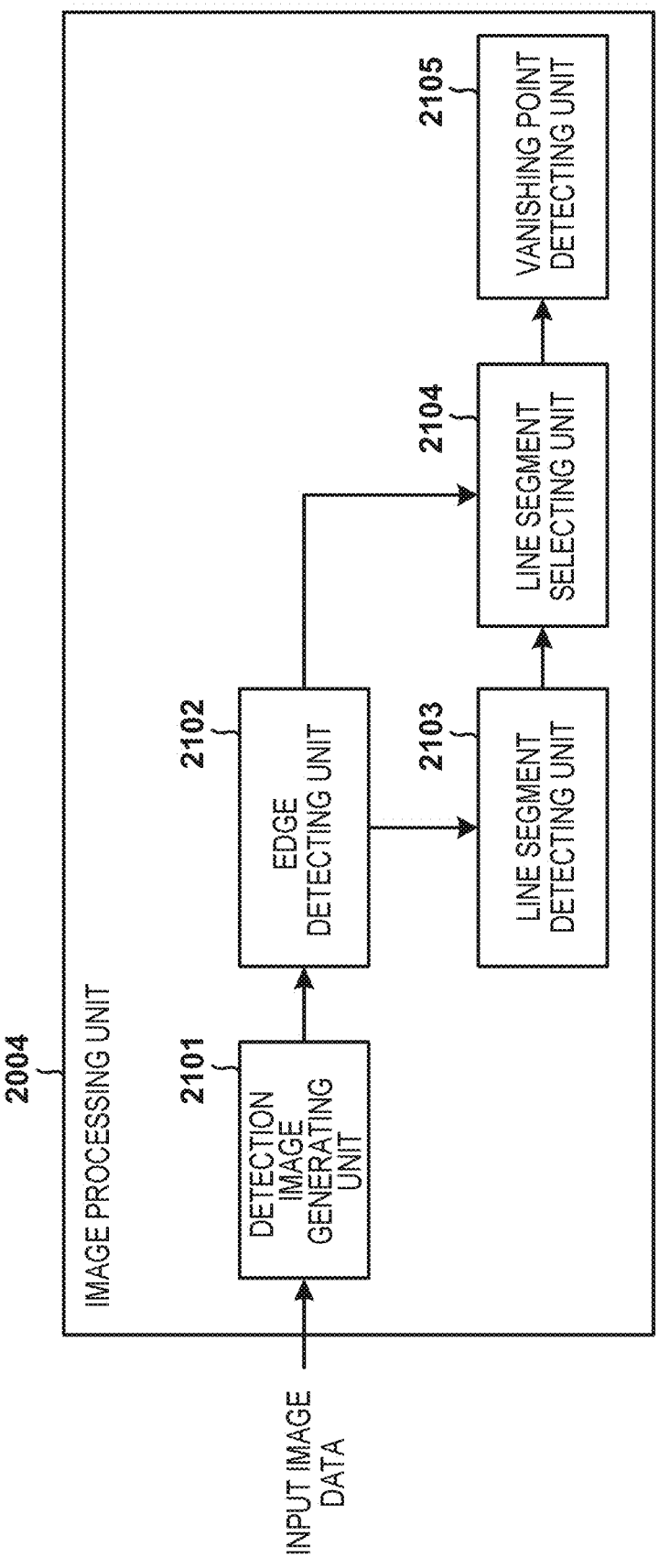
FIG. 21 is a block diagram illustrating the configuration, in an image processing unit 2004, pertaining to a vanishing point detection process.
Figure 22A:
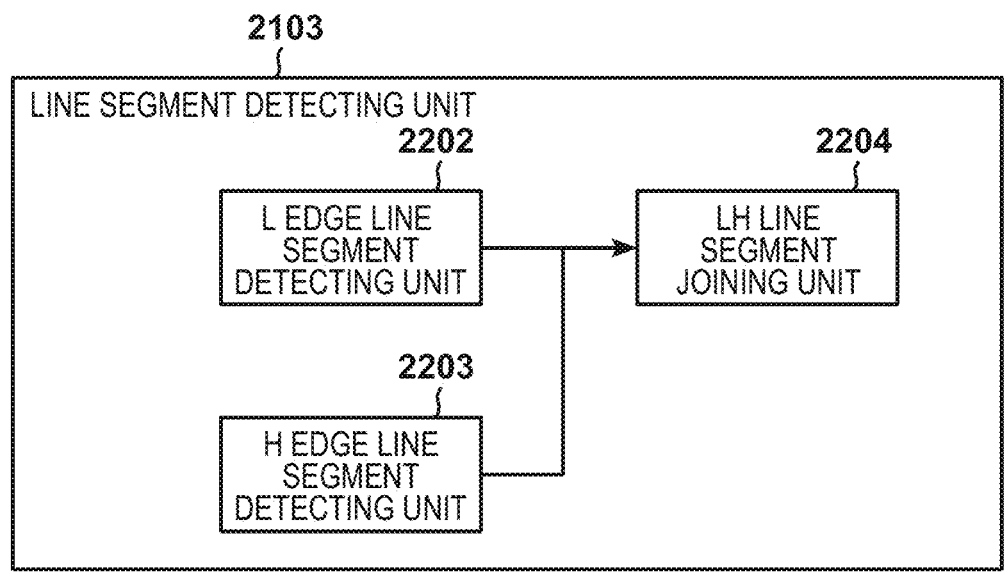
FIG. 22A is a block diagram illustrating the configuration of a line segment detecting unit 2103 indicated in FIG. 21.
Figure 22B:
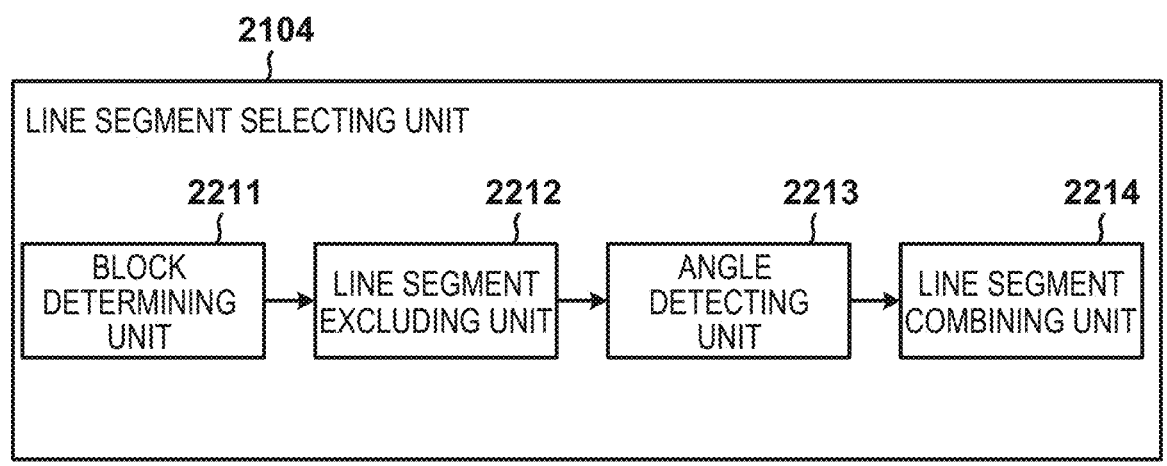
FIG. 22B is a block diagram illustrating the configuration of a line segment selecting unit 2104 indicated in FIG. 21.

An image processing unit 2004 carries out various types of image processing, such as developing processing, on input image data. The image processing unit 2004 also carries out a vanishing point detection process, which will be described later. FIG. 21 is a block diagram illustrating the configuration of the image processing unit 2004 pertaining to the vanishing point detection process, FIG. 22A is a block diagram illustrating the configuration of a line segment detecting unit 2103 indicated in FIG. 21, and FIG. 22B is a block diagram illustrating the configuration of a line segment selecting unit 2104 indicated in FIG. 21. Details regarding the processing handled by each block indicated in FIGS. 21, 22A, and 22B will be given later. The image processing unit 2004 can carry out the same processing on both image data output from the A/D conversion unit 2003 and image data read out from a recording unit 2007.

A control unit 2005 calculates an exposure amount used when capturing an image, and controls an aperture, a shutter speed, a sensor analog gain, and so on through the optical system 2001 and the image capturing unit 2002. A display unit 2006 functions as an electronic viewfinder (EVF) by continuously displaying the image data output from the image processing unit 2004 in a display member such as an LCD. The recording unit 2007 has a function for recording image data, and may include an information recording medium using a memory card provided with a semiconductor memory, a package containing a rotating recording medium such as a magneto-optical disk, or the like, for example.

Figure 23B:
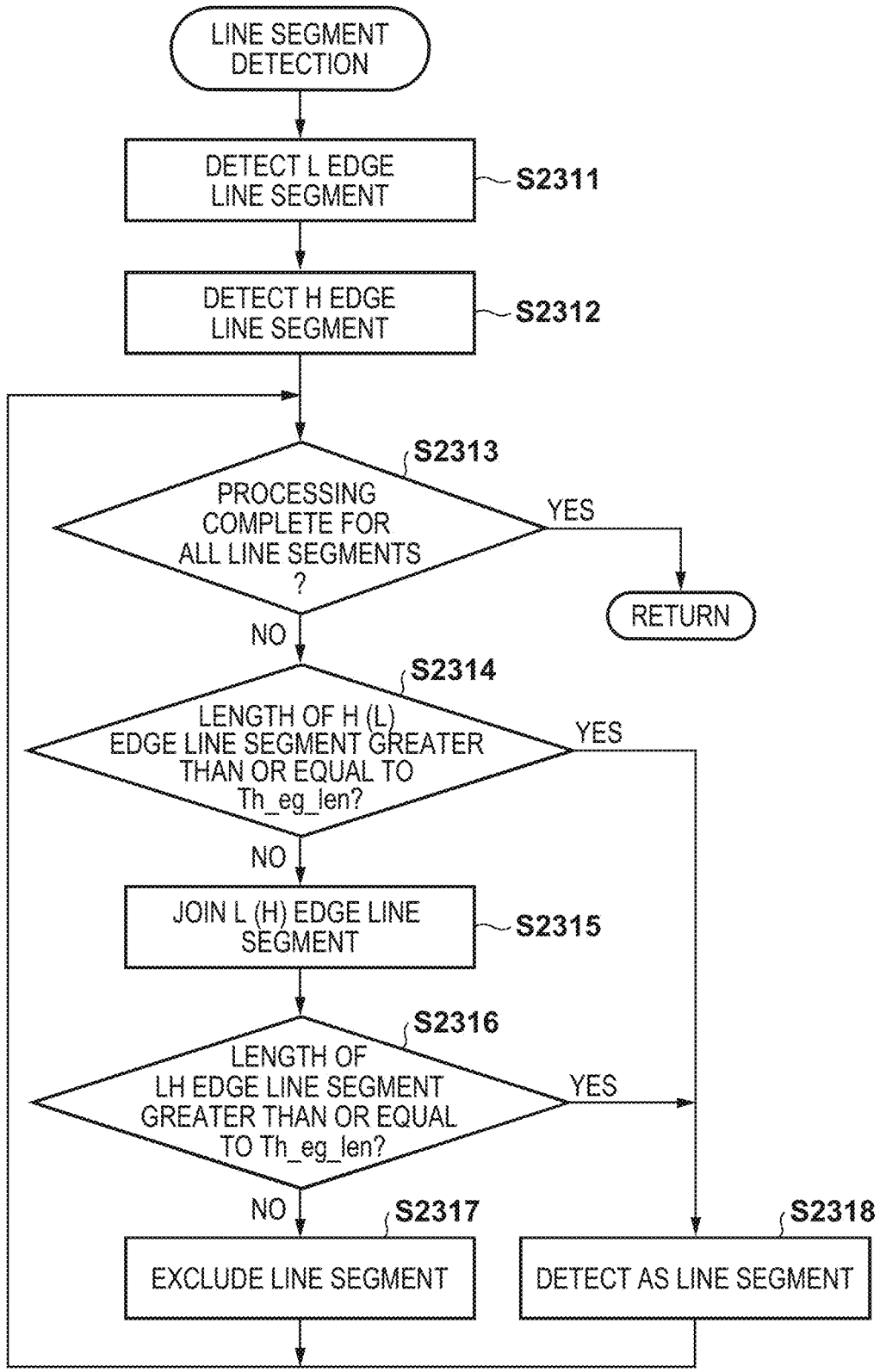
FIG. 23B is a flowchart illustrating details of a line segment detection process performed in step S2303.
Figure 24:
FIG. 24 is a diagram illustrating an example of a captured image.

FIG. 23A is a flowchart illustrating the vanishing point detection process. In step S2301, a detection image generating unit 2101 generates a vanishing point detection image from the captured image. FIG. 24 is a diagram illustrating an example of the captured image. The "vanishing point detection image" is an image generated by increasing the strength of an edge enhancement process beyond that used in a normal captured image (an image for recording). In such an image, regions having a high imaged height often have lower resolutions than the center of the image, and reduced edge amplitudes, depending on the characteristics of the optical system 2001. Accordingly, the detection image generating unit 2101 carries out control such that, in a process for increasing the level of edge emphasis for regions having a high imaged height such as that described in Japanese Patent Laid-Open No. 2009-284101, the enhancement is increased beyond that used for the image for recording. Similarly, the signal values themselves in low-luminance regions are lower than in mid- and high-luminance regions, and thus the edge amplitudes are also reduced. Accordingly, the detection image generating unit 2101 carries out control such that, in an edge correction process based on the luminance signals such as that described in Japanese Patent Laid-Open No. 8-9199, the level of enhancement on the low-luminance regions is increased beyond that used for the image for recording. These processes make it possible to suppress the edge amplitudes from decreasing in regions such as those described above.

In step S2302, an edge detecting unit 2102 detects edge signals by applying a Sobel filter to the vanishing point detection image generated from a captured image 2401. Specifically, the edge detecting unit 2102 generates an edge image, such as an edge image 2501 illustrated in FIG. 25A, by adding an image to which a filter such as that indicated by the following Formula (3) has been applied, in the horizontal (H) and vertical (V) directions.

$$H: \begin{bmatrix} 1 & 0 & -1 \\ 2 & 0 & -2 \\ 1 & 0 & -1 \end{bmatrix}, V: \begin{bmatrix} 1 & 2 & 1 \\ 0 & 0 & 0 \\ -1 & -2 & -1 \end{bmatrix} \quad (3)$$

Note that the method for detecting the edge signals is not limited to the above-described method. For example, the edge detecting unit 2102 may detect the edge signals using another method, such as calculating a difference between the vanishing point detection image and an image obtained by applying a low-pass filter (LPF) to the vanishing point detection image.

In step S2303, the line segment detecting unit 2103 detects line segments from the edge image generated in step S2302. FIG. 22A is a block diagram illustrating the configuration of the line segment detecting unit 2103, and FIG. 23B is a flowchart illustrating the line segment detection process carried out in step S2303 of FIG. 23A. The line segment detection process will be described in detail with reference to FIGS. 22A and 23B.

Figure 25C:
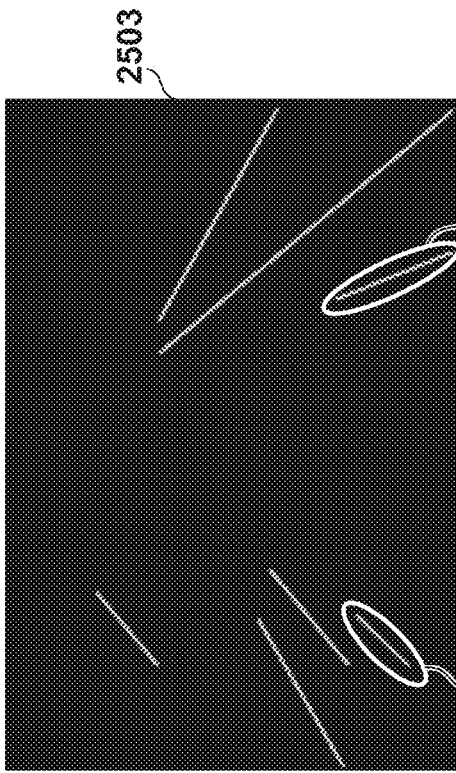
FIG. 25C is a diagram illustrating an H edge line segment detection result corresponding to the edge image 2501.

In step S2311, an L edge line segment detecting unit 2202 detects an edge signal having a magnitude, in the edge image 2501, less than a threshold Th_eg_low (that is, less than a third threshold), or in other words, a line segment constituted of a low-amplitude edge (an L edge line segment). Specifically, the L edge line segment detecting unit 2202 first generates an image in which only low-amplitude edge signals are extracted (a low-amplitude edge image) by setting all signals in the edge image 2501 that are greater than or equal to Th_eg_low to 0. Then, the L edge line segment detecting unit 2202 carries out a process for extracting line segments having a length greater than or equal to a threshold by applying a Hough transform to the low-amplitude edge image. The Hough transform can be carried out by using any desired known technique, but to give one example, a cvHoughLines2 function used in OpenCV can be used. FIG. 25B is a diagram illustrating an L edge line segment detection result corresponding to the edge image 2501. In FIG. 25B, an L edge line segment image 2502 is an image indicating the L edge line segment detection result corresponding to the edge image 2501, and the parts indicated by white highlighting are regions detected as line segments. From this, it can be seen that line segments are being detected from subjects that have fine textures as well as line-shaped subjects. This is because many points having high amplitudes (edges) are present locally on a single straight line in the Hough transform, and these are detected as a single line segment.

In step S2312, an H edge line segment detecting unit 2203 detects an edge signal having a magnitude, in the edge image 2501, greater than or equal to a threshold Th_eg_high (that is, greater than or equal to a fourth threshold), or in other words, a line segment constituted of a high-amplitude edge (an H edge line segment). Specifically, the H edge line segment detecting unit 2203 first generates an image in which only high-amplitude edge signals are extracted (a high-amplitude edge image) by setting all signals in the edge image 2501 that are less than Th_eg_high to 0. Then, the H edge line segment detecting unit 2203 carries out a process for extracting line segments having a length greater than or equal to a threshold by applying a Hough transform to the high-amplitude edge image. FIG. 25C is a diagram illustrating an H edge line segment detection result corresponding to the edge image 2501. In FIG. 25C, an H edge line segment image 2503 is an image indicating the H edge line segment detection result corresponding to the edge image 2501, and the parts indicated by white highlighting are regions detected as line segments.

In step S2313, an LH line segment joining unit 2204 determines whether or not the processing from steps S2314 to S2318 is complete for all of the line segments detected in steps S2311 and S2312. In the case where the processing is complete for all of the line segments, the LH line segment joining unit 2204 ends the line segment detection process, and when such is not the case, the LH line segment joining unit 2204 advances the processing to step S2314.

In step S2314, the LH line segment joining unit 2204 determines whether or not the length of the line segment being processed (the H edge line segment or the L edge line segment detected in step S2312) is greater than or equal to a threshold Th_eg_len (that is, greater than or equal to a fifth threshold). In the case where the length of the line segment is greater than or equal to Th_eg_len, the LH line segment joining unit 2204 advances the processing to step S2318, whereas when such is not the case, the LH line segment joining unit 2204 advances the processing to step S2315. Here, a length eg_len of the line segment is calculated according to the following Formula (4), assuming the coordinates of the two end points of the line segments are (x1,y1) and (x2,y2), respectively.

$$eg\_len = \sqrt{(x1-x2)^2 + (y1-y2)^2} \qquad (4)$$

In step S2315, the LH line segment joining unit 2204 carries out a process for joining the line segment being processed with a nearby line segment. Specifically, the LH line segment joining unit 2204 detects, from line segments having a different amplitude type (an L edge line segment, for example) from the line segment being processed (an H edge line segment, for example), a line segment having a slope that resembles the slope of the line segment being processed and that passes near the end points of the line segment being processed. In the case where such a line segment has been detected, the LH line segment joining unit 2204 joins the detected line segment to the line segment being processed so as to create a single line segment (an LH edge line segment). With respect to line segments having the same amplitude type (H edge line segments or L edge line segments), such line segments are detected as a single line segment in step S2311 or step S2312 in the case where the line segments are near each other, and thus it is not necessary to join such segments here.

In step S2316, the LH line segment joining unit 2204 again determines whether or not the length of the LH edge line segment (the joined line segment) is greater than or equal to Th_eg_len (that is, greater than or equal to the fifth threshold). The processing advances to step S2318 in the case where the LH edge line segment is greater than or equal to Th_eg_len, and advances to step S2317 when such is not the case.

In step S2317, the LH line segment joining unit 2204 excludes the line segment being processed from the line segments used to detect the vanishing point (the line segments for vanishing point detection). This is because short line segments are highly likely to be line segments detected from subjects having fine textures and are thus unrelated to the vanishing point.

On the other hand, in step S2318, the LH line segment joining unit 2204 detects the line segment being processed (in the case of "Yes" in step S2313) or the LH edge line segment joined in step S2315 (in the case of "Yes" in step S2316) as the line segment for vanishing point detection. This is because long line segments are highly likely to be line segments that constitute the vanishing point.

Figure 25D:
FIG. 25D is a diagram illustrating a line segment detection result corresponding to the edge image 2501.
Figure 25A:
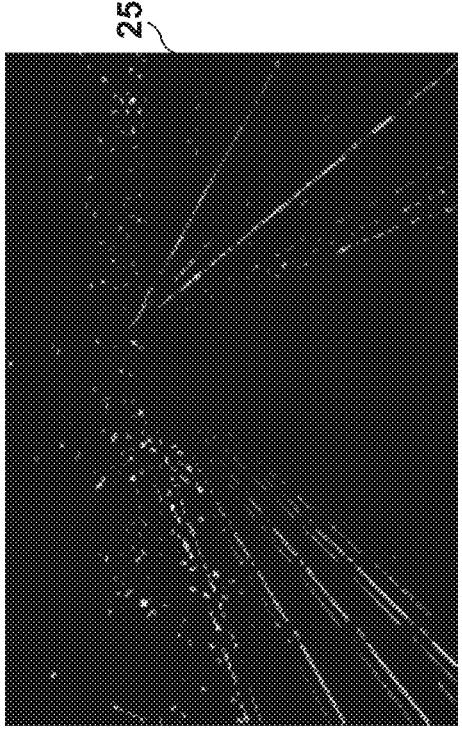
FIG. 25A is a diagram illustrating an edge image 2501 corresponding to a captured image 2401.
Figure 25B:
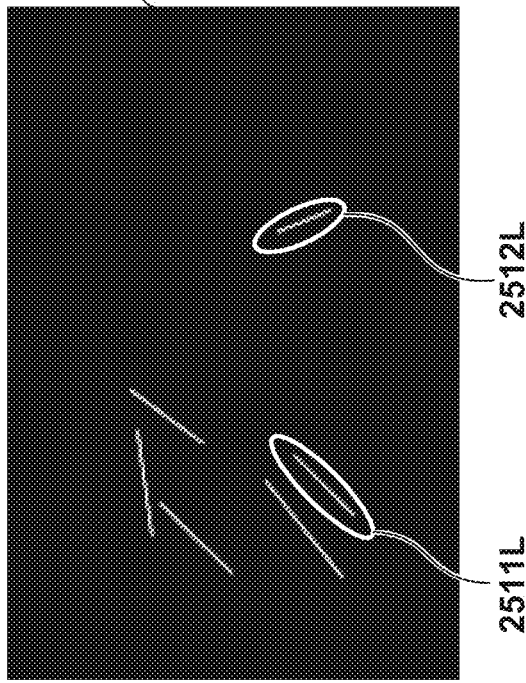
FIG. 25B is a diagram illustrating an L edge line segment detection result corresponding to an edge image 2501.

FIG. 25D illustrates the line segment detection result. In FIG. 25D, an image 2504 is an image indicating a line segment detection result corresponding to the edge image 2501. As can be seen by referring to FIGS. 25B and 25C, in FIG. 25D, an L edge line segment 2511L and an H edge line segment 2511H have been joined to form an LH edge line segment 2511LH. Likewise, an L edge line segment 2512L and an H edge line segment 2512H have been joined to form an LH edge line segment 2512LH.

An effect of detecting the L edge line segment and the H edge line segment separately and then joining those line segments (steps S2311, S2312, and S2315) as above will be described next. In a subject having a fine texture, such as bushes, many low-amplitude edges and high-amplitude edges may be present in an irregular manner. In the case where a Hough transform is carried out on an edge image of such a subject without differentiating between low-amplitude edges and high-amplitude edges, it is highly likely that line segments unrelated to the vanishing point will be detected. On the other hand, if a Hough transform is carried out on the edge image of such a subject for the low-amplitude edges and high-amplitude edges separately, the likelihood that the edge components will be fragmented and detected as line segments is reduced. However, for a subject having an edge whose amplitude weakens in the depth direction, the line segments constituting the vanishing point may be split into short L edge line segments and H edge line segments in the case where the L edge line segments and H edge line segments are detected separately. In this case, the lengths of the individual L edge line segments and H edge line segments will be less than Th_eg_len, and may therefore not be detected as line segments for vanishing point detection. Accordingly, in step S2315, the LH line segment joining unit 2204 joins the L edge line segment and the H edge line segment to generate the original long line segment. This makes it possible to reduce the likelihood that line segments that are originally long will be excluded from the line segments for vanishing point detection.

Note that the two thresholds Th_eg_low and Th_eg_high for detecting the L edge line segments and the H edge line segments may be the same value, or may be different values. In the case where Th_eg_low is greater than Th_eg_high, the same line segment (or a part thereof) may be detected as both an L edge line segment and an H edge line segment, but a failure to detect the line segment can nevertheless be reduced.

Figure 23C:
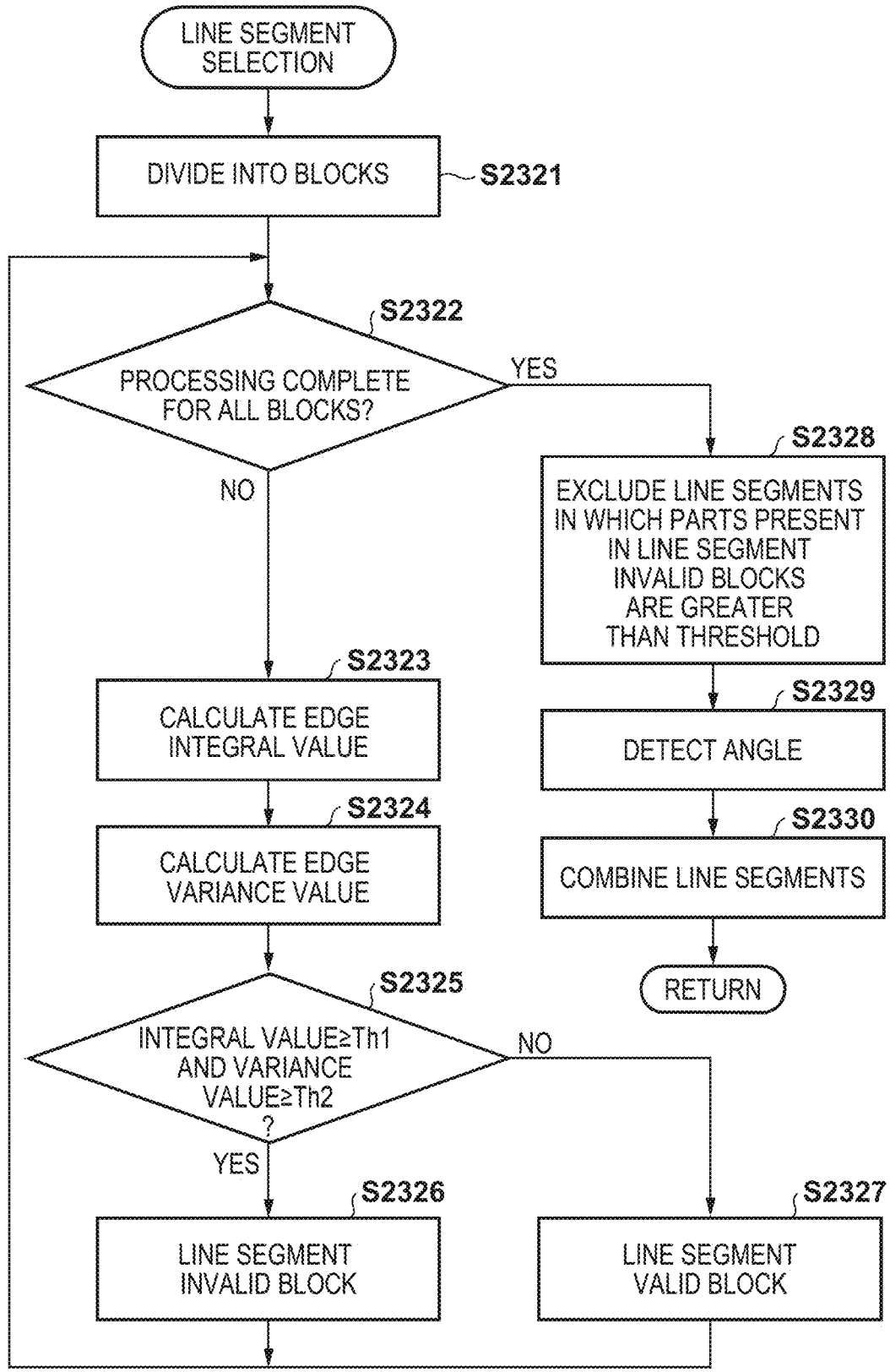
FIG. 23C is a flowchart illustrating details of a line segment selection process performed in step S2304.

Returning to FIG. 23A, in step S2304, the line segment selecting unit 2104 selects, from the line segments detected in step S2303, a line segment for vanishing point detection. FIG. 22B is a block diagram illustrating the configuration of the line segment selecting unit 2104, and FIG. 23C is a flowchart illustrating the line segment selection process carried out in step S2304 of FIG. 23A. The line segment selection process will be described in detail hereinafter with reference to FIGS. 22B and 23C.

Figure 26C:
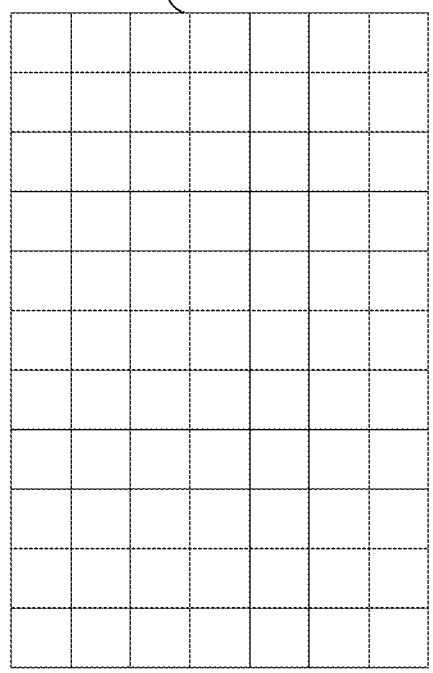
FIG. 26C is a diagram illustrating variance values in the edge image 2501 in units of blocks.
Figure 26D:
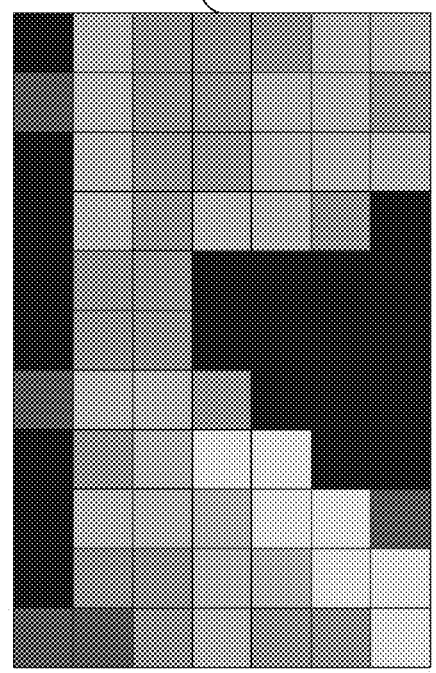
FIG. 26D is a diagram illustrating whether each block in the edge image 2501 is a line segment valid block or a line segment invalid block.
Figure 26A:
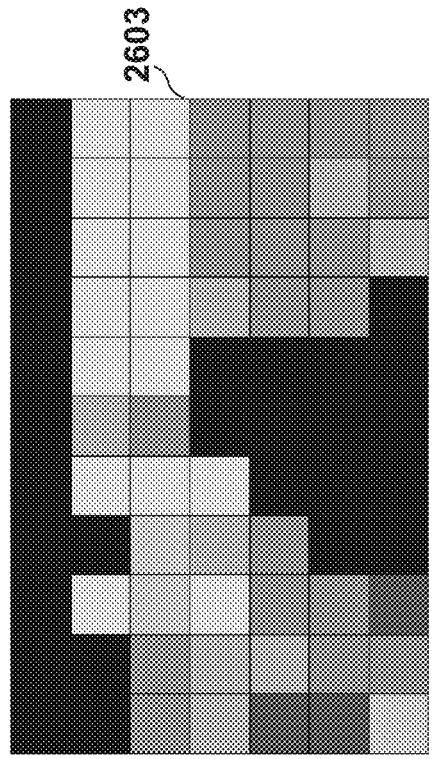
FIG. 26A is a diagram illustrating a method for dividing the edge image 2501.

In step S2321, a block determining unit 2211 divides the edge image 2501 into blocks of a predetermined size. An image 2601 in FIG. 26A indicates the method for dividing the edge image 2501. In this example, the edge image 2501 is divided into 11×7 square blocks (division regions). Note that the unit of division may be a different size instead.

In step S2322, the block determining unit 2211 determines whether or not the processing from steps S2323 to S2327 is complete for all of the blocks obtained from the division carried out in step S2321. In the case where the processing is complete for all of the blocks, the block determining unit 2211 advances the processing to step S2328, whereas when such is not the case, the block determining unit 2211 advances the processing to step S2323.

Figure 26B:
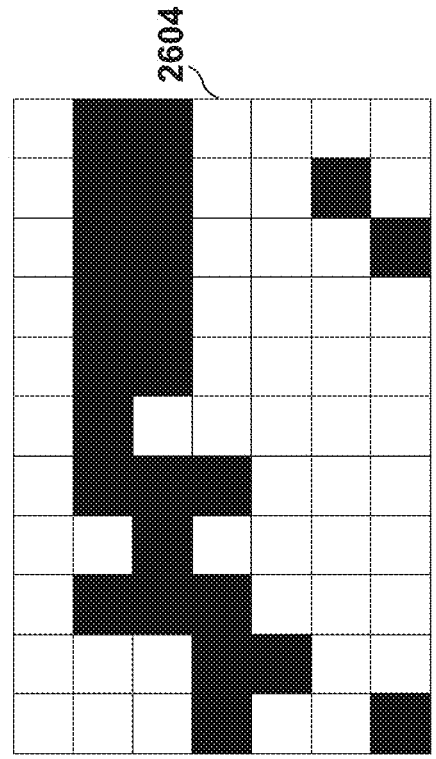
FIG. 26B is a diagram illustrating a result of integrating the edge image 2501 in units of blocks.

In step S2323, the block determining unit 2211 carries out a process for integrating the edge image 2501 in units of blocks. An image 2602 in FIG. 26B indicates a result of integrating the edge image 2501 in units of blocks, where blocks closer to white indicate higher edge integral values.

In step S2324, the block determining unit 2211 carries out a process for calculating variance values from the edge image 2501 in units of blocks. An image 2603 in FIG. 26C indicates the variance values of the edge image 2501 in units of blocks, where blocks closer to white indicate higher edge variance values. From this, it can be seen that edges having various amplitudes are included in the blocks where many subjects are present, and the variance values are therefore high.

In step S2325, the block determining unit 2211 determines whether or not the integral value and the variance value of a block being processed are greater than or equal to thresholds Th1 and Th2, respectively. In the case where the integral value is greater than or equal to Th1 and the variance value is greater than or equal to Th2, the block determining unit 2211 advances the processing to step S2326, whereas when such is not the case, the block determining unit 2211 advances the processing to step S2327.

In step S2326, the block determining unit 2211 sets the block being processed as a line segment invalid block. On the other hand, in step S2327, the block determining unit 2211 sets the block being processed as a line segment valid block. An image 2604 in FIG. 26D indicates whether each block is a line segment valid block or a line segment invalid block, where white blocks indicate line segment valid blocks and black blocks indicate line segment invalid blocks.

In step S2328, a line segment excluding unit 2212 carries out a process for excluding the line segments, among all of the line segments detected in step S2303 (see FIG. 25D), the line segments not needed in the vanishing point detection, from the selection process. Specifically, the line segment excluding unit 2212 calculates, for each line segment, a ratio of the part of the line segment contained in line segment invalid blocks. The line segment excluding unit 2212 then excludes line segments for which the calculated ratio is greater than a threshold (50%, for example) from the selection process. This is done in order to exclude line segments detected from subjects having edges of a variety of amplitudes as unnecessary line segments that have a higher-than-standard level of image complexity. To rephrase, line segments for which a ratio of the part of the line segment contained in line segment valid blocks is greater than or equal to a threshold (greater than or equal to a second threshold) are not excluded, and instead remain. An image 2701 in FIG. 27A indicates a result of excluding the line segments. Compared to FIG. 25D, it can be seen that line segments included in regions having fine textures and so on are excluded, and only line segments included in linear subjects remain. However, the image complexity of a line segment may be determined without taking into consideration the ratio of the parts of the line segment included in line segment valid blocks.

Figure 27A:
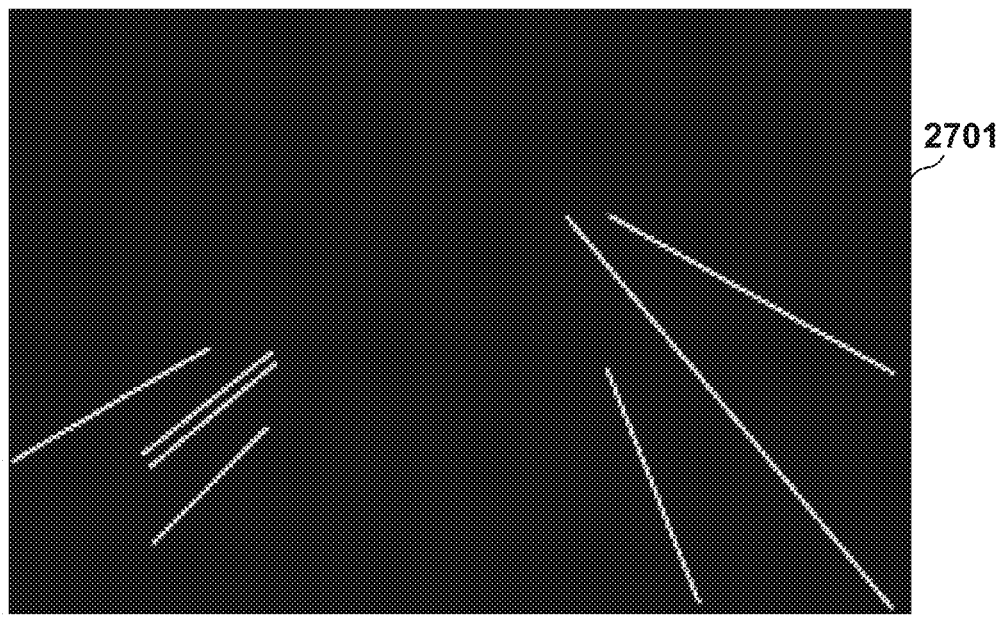
FIG. 27A is a diagram illustrating a line segment exclusion result.

In step S2329, an angle detecting unit 2213 detects an angle (a slope) of each line segment not excluded in step S2328 (see FIG. 27A).

Figure 27B:
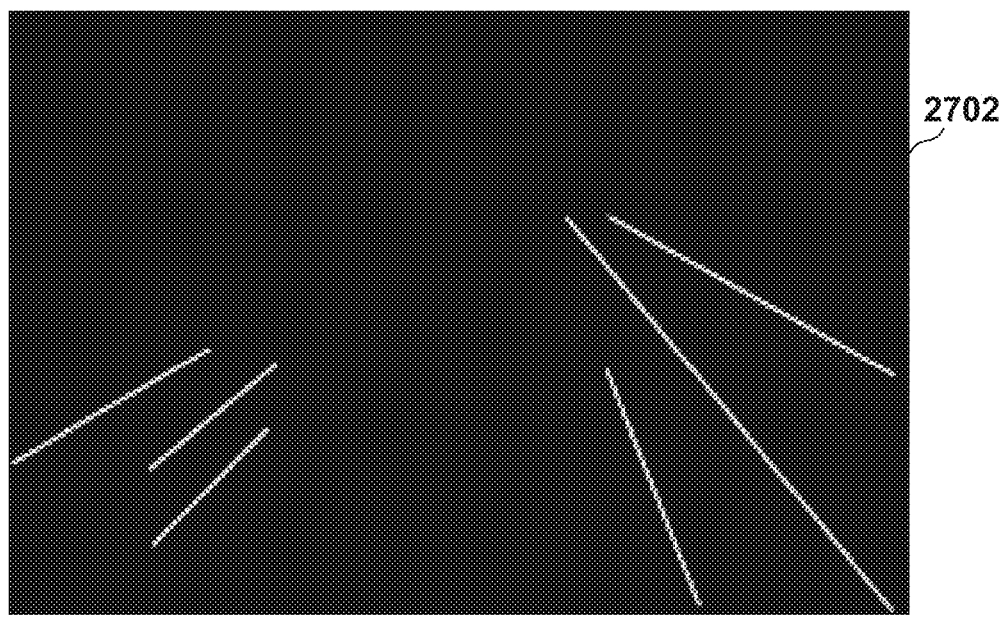
FIG. 27B is a diagram illustrating a line segment combination result.

In step S2330, a line segment combining unit 2214 carries out a process for combining two or more line segments into a single line segment. Specifically, the line segment combining unit 2214 combines line segments, among the line segments not excluded in step S2328 (see FIG. 27A), that have similar slopes and intercepts (in other words, line segments having similar slopes and positions) so as to form a single line segment. This is done in order to suppress excessive detection of line segments from wide line-shaped subjects, subjects having diagonal edges, and so on. It is particularly easy to detect a plurality of line segments from diagonal edges having slopes that are not a multiple of 45 degrees. This is because while the coordinates of pixels in an image have integer accuracy, the slope and intercept in a formula expressing the line segment have fractional accuracy, and thus a plurality of line segments having similar slopes and intercepts are detected from groups of points distributed diagonally. As such, in the case where the slopes of two line segments are multiples of 45 degrees, the line segment combining unit 2214 may use stricter criteria for determining that the two line segments are at similar positions than in the case where the slopes of the two line segments are not multiples of 45 degrees. When combining the two line segments, the line segment combining unit 2214 preferentially selects the longer of the two line segments, and does not select the other. Meanwhile, in the case where the two line segments are the same length, the line segment combining unit 2214 selects the line segment having the greater edge amplitude, or in other words, the line segment having the higher value obtained when integrating the edge signals along the line segment. However, the combination method is not limited thereto. An image 2702 in FIG. 27B indicates the line segments remaining after the combination (the line segments ultimately selected as line segments for vanishing point detection), and compared to FIG. 27A, it can be seen that two line segments that had appeared as a double line are now a single line segment.

In the descriptions of steps S2322 to S2328, the determination as to whether or not a line segment is present in a region having a fine texture (that is, a region having a higher value indicating a higher-than-standard image complexity) is carried out on the basis of the integral values and variance values of the edge components in units of blocks. However, this is merely an example, and the present embodiment is not limited to this method. More generally, in the case where the image complexity in a partial region containing the line segment being processed is less than or equal to a threshold (less than or equal to a first threshold), the line segment excluding unit 2212 selects that line segment, whereas when such is not the case, the line segment excluding unit 2212 excludes that line segment. When carrying out the processing in units of blocks, for example, the line segment excluding unit 2212 selects a line segment in the case where the ratio of the parts of that line segment present in blocks in which the image complexity is less than or equal to the threshold (less than or equal to the first threshold) is greater than or equal to a threshold (greater than or equal to a second threshold). At least one of an index value of an amount of edge components (an integral value of the edge components, for example) and an index value of variation in the edge components (a variance value of the edge components, for example) can be used as the image complexity.

Figure 28:
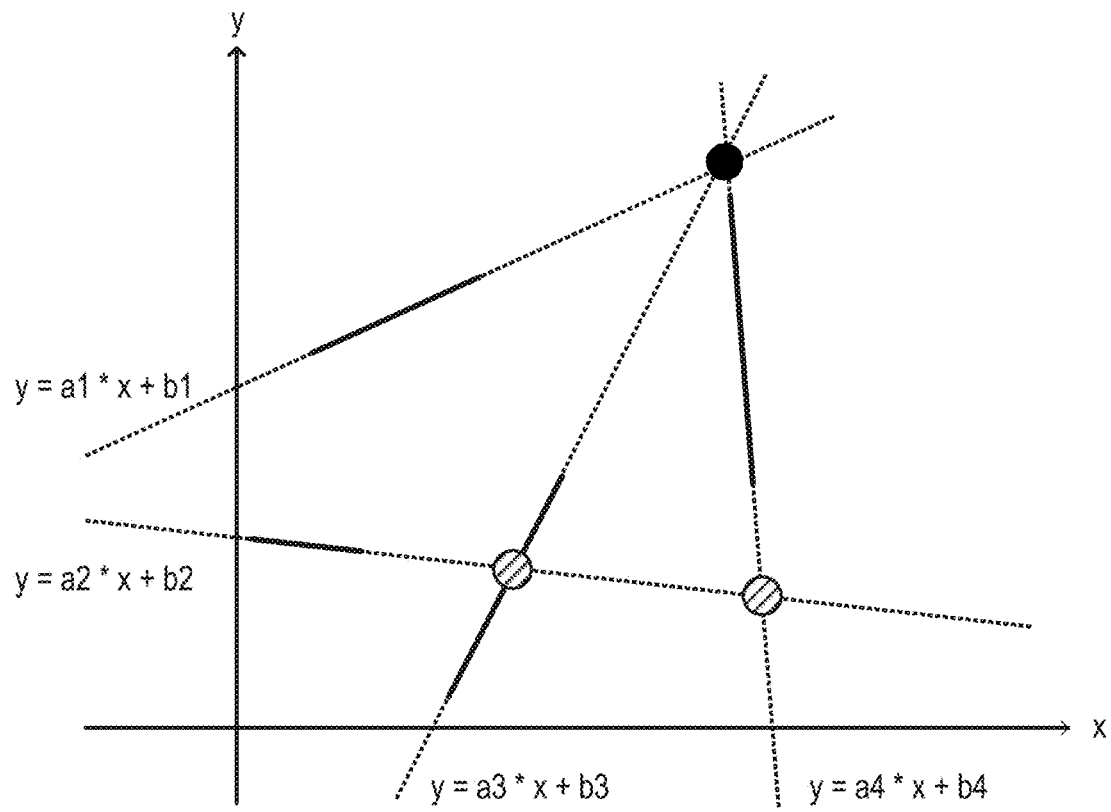
FIG. 28 is a diagram illustrating a method for calculating the coordinates of a vanishing point.
Figure 29:
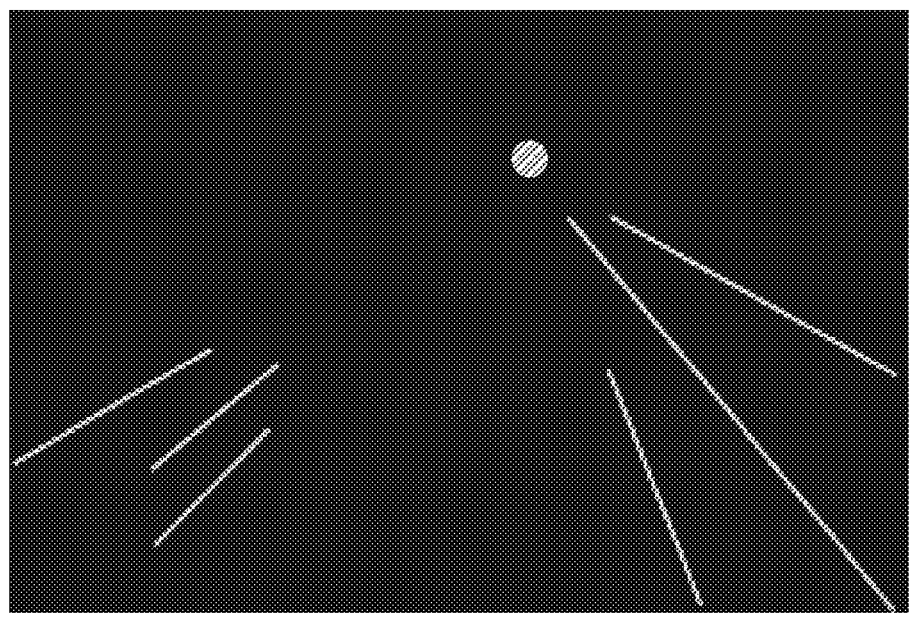
FIG. 29 is a diagram illustrating a vanishing point calculated on the basis of six line segments selected in the captured image 2401 illustrated in FIG. 24.

Returning to FIG. 23A, in step S2305, a vanishing point detecting unit 2105 calculates the coordinates of the vanishing point using the line segments selected in step S2304. FIG. 28 illustrates the calculation method in detail. In FIG. 28, the line segments drawn as four bold lines indicate an example of the four line segments selected for use in the coordinate calculation, expressed in an xy coordinate space. Dotted lines indicate straight lines extending in the x-axis direction and the y-axis direction from these four line segments. First, the vanishing point detecting unit 2105 calculates the coordinates of points of intersection between each pair of two straight lines, on the basis of the slopes and intercepts of those straight lines. Then, the vanishing point detecting unit 2105 selects, as the final vanishing point, the point, among the points of intersection for which the coordinates have been calculated, where the most straight lines intersect (or pass through the vicinity). In FIG. 28, there are a plurality of points of intersection among the straight lines, and thus the coordinates of the point of intersection, indicated by a black point, through which the most straight lines pass, namely three straight lines, are calculated as the coordinates of the vanishing point. FIG. 29 illustrates a vanishing point calculated on the basis of six line segments selected in the captured image 2401 illustrated in FIG. 24. In FIG. 29, the point indicated by the hatched circle is the vanishing point. Note that in the case where one line segment or no line segments have been selected in step S2304, there are no points of intersection among straight lines, and thus the vanishing point detecting unit 2105 determines that there is no vanishing point.

In step S2306, the vanishing point detecting unit 2105 calculates a confidence level VpConf for the vanishing point detected in step S2305, using the following Formula (5). In Formula (5), LineNum represents the number of line segments selected in step S2304, and IntersctNum represents the number of straight lines passing through the coordinates of the detected vanishing point.

$$VpConf = 255 \times \frac{IntersctNum}{LineNum} \tag{5}$$

As can be seen from Formula (5), the confidence level VpConf is set to a higher value as the ratio of the number of straight lines passing through the vanishing point to the number of selected line segments increases.

According to the fourth embodiment as described thus far, the image capturing apparatus 2000 detects line segments from an image and, from the detected line segments, selects a line segment for vanishing point detection. At this time, in the case where the image complexity in a partial region containing the line segment is less than or equal to a threshold, the image capturing apparatus 2000 selects that line segment as the line segment for vanishing point detection. Through this, the accuracy at which the vanishing point is detected can be improved.

Although the present embodiment describes a configuration in which the level of edge emphasis is changed for each imaged height and luminance when generating the vanishing point detection image, the configuration is not limited thereto, and the control may refer to other information, such as a distance in the depth direction. For example, in an optical imaging system having a plurality of photoelectric conversion units in a single pixel such as that described in Japanese Patent Laid-Open No. 2016-9062, distance information can be generated on the basis of a phase difference between the respective captured images. The edge emphasis can then be increased for far-distance regions where the edge amplitude is likely to decrease. Meanwhile, a compound eye camera having a plurality of lenses and image sensors, a Time of Flight (TOF) camera, and so on can be used as configurations for obtaining the distance information.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-127859, filed Jun. 28, 2016, Japanese Patent Application No. 2016-127860, filed Jun. 28, 2016, and Japanese Patent Application No. 2017-091400, filed May 1, 2017 which are hereby incorporated by reference herein in their entirety.

What is claimed is:

1. An image processing apparatus comprising one or more processors and a memory storing a program which, when executed by the one or more processors, causes the image processing apparatus to function as:
   a line segment detecting unit configured to detect line segments from an image;
   an obtainment unit configured to obtain distance information indicating a distance in a depth direction of the image;
   a selecting unit configured to select a line segment for vanishing point detection from the line segments detected by the line segment detecting unit;
   a vanishing point detecting unit configured to detect a vanishing point of the image on a basis of the line segment for vanishing point detection, wherein the vanishing point detecting unit detects a point of intersection of straight lines including the line segment for vanishing point detection as the vanishing point; and
   a determining unit configured to determine a confidence level of the vanishing point on a basis of a number of the line segments for vanishing point detection constituting the vanishing point detected by the vanishing point detecting unit,
   wherein for each line segment detected by the line segment detecting unit, the selecting unit selects the line segment in a case where the distance indicated by the distance information is in a monotonically changing trend along the line segment, and
   wherein in a case where the line segment for vanishing point detection constituting the vanishing point reaches a distance less than or equal to a first threshold from the vanishing point, the determining unit determines the confidence level of the vanishing point further on a basis of the distance indicated by the distance information corresponding to the vanishing point.

2. The image processing apparatus according to claim 1, wherein in a case where a monotonically increasing section or a monotonically decreasing section having a length greater than or equal to a second threshold is present in the line segment, the selecting unit determines that the distance is in a monotonically changing trend along the line segment.

3. The image processing apparatus according to claim 2, wherein:
   the monotonically increasing section is a section in which the distance corresponding to a plurality of positions in the line segment continually increases along the line segment; and
   the monotonically decreasing section is a section in which the distance corresponding to a plurality of positions in the line segment continually decreases along the line segment.

4. The image processing apparatus according to claim 2, wherein:
   the monotonically increasing section is a section in which a part where the distance corresponding to a plurality of positions in the line segment decreases along the line segment is not present and a length of a part where the distance does not change is less than or equal to a third threshold; and
   the monotonically decreasing section is a section in which a part where the distance corresponding to a plurality of positions in the line segment increases along the line segment is not present and a length of a part where the distance does not change is less than or equal to a fourth threshold.

5. The image processing apparatus according to claim 2, wherein based on a length of the line segment, the second threshold is greater in a case where the line segment is a second length greater than a first length, than in a case where the line segment is the first length.

6. The image processing apparatus according to claim 1, wherein the obtainment unit obtains confidence level information indicating a confidence level of the distance indicated by the distance information; and
   the selecting unit determines whether or not the distance is in a monotonically changing trend along the line segment on a basis of a distance, among the distances indicated by the distance information, for which the confidence level is greater than or equal to a fifth threshold.

7. The image processing apparatus according to claim 1, wherein in a case where a plurality of points of intersection for straight lines including the line segment for vanishing point detection are present, the vanishing point detecting unit detects the point of intersection through which the most straight lines pass as the vanishing point.

8. The image processing apparatus according to claim 1, wherein the program further causes the image processing apparatus to function as:
   a correcting unit configured to carry out a correction process on the image on a region-by-region basis at a correction strength based on a distance from the vanishing point.

9. The image processing apparatus according to claim 8, wherein the correction process includes a process of correcting at least one of a brightness, a contrast, a hue, and a saturation of the image.

10. An image capturing apparatus comprising one or more processors and a memory storing a program which, when executed by the one or more processors, causes the image capturing apparatus to function as:
    an image capturing unit configured to generate an image;
    a line segment detecting unit configured to detect line segments from an image;
    an obtainment unit configured to obtain distance information indicating a distance in a depth direction of the image;

a selecting unit configured to select a line segment for vanishing point detection from the line segments detected by the line segment detecting unit;

a vanishing point detecting unit configured to detect a vanishing point of the image on a basis of the line segment for vanishing point detection, wherein the vanishing point detecting unit detects a point of intersection of straight lines including the line segment for vanishing point detection as the vanishing point; and a determining unit configured to determine a confidence level of the vanishing point on a basis of a number of the line segments for vanishing point detection constituting the vanishing point detected by the vanishing point detecting unit, wherein for each line segment detected by the line segment detecting unit, the selecting unit selects the line segment in a case where the distance indicated by the distance information is in a monotonically changing trend along the line segment, and wherein in a case where the line segment for vanishing point detection constituting the vanishing point reaches a distance less than or equal to a first threshold from the vanishing point, the determining unit determines the confidence level of the vanishing point further on a basis of the distance indicated by the distance information corresponding to the vanishing point.

11. An image processing method comprising:

detecting line segments from an image;

obtaining distance information indicating a distance in a depth direction of the image;

selecting a line segment for vanishing point detection from the line segments detected by the line segment detecting step;

detecting a vanishing point of the image on a basis of the line segment for vanishing point detection, wherein a point of intersection of straight lines including the line segment for vanishing point detection is detected as the vanishing point; and determining a confidence level of the vanishing point on a basis of a number of the line segments for vanishing point detection constituting the vanishing point detected by the vanishing point detecting step, wherein for each line segment detected by the line segment detecting step, the selecting step selects the line segment in a case where the distance indicated by the distance information is in a monotonically changing trend along the line segment, and wherein in a case where the line segment for vanishing point detection constituting the vanishing point reaches a distance less than or equal to a first threshold from the vanishing point, the determining step determines the confidence level of the vanishing point further on a basis of the distance indicated by the distance information corresponding to the vanishing point.

12. A non-transitory computer-readable storage medium which stores a program for causing a computer to execute an image processing method comprising:

detecting line segments from an image;

obtaining distance information indicating a distance in a depth direction of the image;

selecting a line segment for vanishing point detection from the line segments detected by the line segment detecting step;

detecting a vanishing point of the image on a basis of the line segment for vanishing point detection, wherein a point of intersection of straight lines including the line segment for vanishing point detection is detected as the vanishing point; and determining a confidence level of the vanishing point on a basis of a number of the line segments for vanishing point detection constituting the vanishing point detected by the vanishing point detecting step, wherein for each line segment detected by the line segment detecting step, the selecting step selects the line segment in a case where the distance indicated by the distance information is in a monotonically changing trend along the line segment, and wherein in a case where the line segment for vanishing point detection constituting the vanishing point reaches a distance less than or equal to a first threshold from the vanishing point, the determining step determines the confidence level of the vanishing point further on a basis of the distance indicated by the distance information corresponding to the vanishing point.

* * * * *